(12) United States Patent
Inoue et al.

(10) Patent No.: US 9,551,363 B2
(45) Date of Patent: Jan. 24, 2017

(54) VEHICLE-BODY ATTACHMENT STRUCTURE FOR ELECTRIC BRAKE ACTUATOR

(75) Inventors: Arata Inoue, Saitama (JP); Takaaki Ohnishi, Saitama (JP); Kazuaki Murayama, Saitama (JP); Takehiro Horiuchi, Saitama (JP); Makoto Sawai, Saitama (JP); Kaoru Akahane, Saitama (JP); Toru Mabuchi, Saitama (JP); Nobuyuki Kobayashi, Tochigi (JP)

(73) Assignees: Honda Motor Co., Ltd., Tokyo (JP); Autoliv Nissin Brake Systems Japan Co., Ltd., Nagano (JP)

( * ) Notice: Subject to any disclaimer, the term of this patent is extended or adjusted under 35 U.S.C. 154(b) by 531 days.

(21) Appl. No.: 13/885,067

(22) PCT Filed: Nov. 17, 2011

(86) PCT No.: PCT/JP2011/076583
§ 371 (c)(1),
(2), (4) Date: Jul. 22, 2013

(87) PCT Pub. No.: WO2012/067207
PCT Pub. Date: May 24, 2012

(65) Prior Publication Data
US 2013/0291533 A1     Nov. 7, 2013

(30) Foreign Application Priority Data
Nov. 17, 2010   (JP) .................................. 2010-257358

(51) Int. Cl.
*F15B 15/00*   (2006.01)
*B60T 17/08*   (2006.01)
(Continued)

(52) U.S. Cl.
CPC ............... *F15B 15/00* (2013.01); *B60T 7/042* (2013.01); *B60T 8/3685* (2013.01); *B60T 8/4081* (2013.01);
(Continued)

(58) Field of Classification Search
CPC .... B60T 8/3685; B60T 8/4031; B60T 17/088; B60T 17/042; B60T 7/042; B60T 8/4081; B60T 11/16; B60T 13/745; B60T 13/662; F15B 15/00; B62D 25/082
See application file for complete search history.

(56) References Cited

U.S. PATENT DOCUMENTS 2,174,615 A * 10/1939 Bowen .................... B60T 11/20
                                                                 188/345
4,653,815 A   3/1987 Agarwal et al.
(Continued)

FOREIGN PATENT DOCUMENTS

CN    101070066 A    11/2007
EP    0 448 031 A1    9/1991
(Continued)

OTHER PUBLICATIONS

Extended European search report issued in corresponding EP Patent Application 11842290.6 dated Apr. 2, 2014.
(Continued)

*Primary Examiner* — Logan Kraft
(74) *Attorney, Agent, or Firm* — Carrier Blackman & Associates, P.C.; William D. Blackman; Jeffrey T. Gedeon

(57) ABSTRACT

Untreated bosses are formed in advance in two directions on a cylinder mechanism. The bosses on one side are formed as mounts to attach a motor cylinder device to a vehicle body, and the other bosses are formed as ports to connect to the cylinder mechanism. The mount bosses are formed on the outside in the width direction of the vehicle, and the port
(Continued)

bosses are formed on the inside in the width direction of the vehicle.

12 Claims, 16 Drawing Sheets

(51) Int. Cl.
*B60T 7/04* (2006.01)
*B60T 8/36* (2006.01)
*B60T 8/40* (2006.01)
*B60T 13/66* (2006.01)
*B60T 13/74* (2006.01)
*B62D 25/08* (2006.01)
*B60T 11/16* (2006.01)

(52) U.S. Cl.
CPC ............ *B60T 13/662* (2013.01); *B60T 13/745* (2013.01); *B60T 17/088* (2013.01); *B62D 25/082* (2013.01); *B60T 11/16* (2013.01)

(56) References Cited

U.S. PATENT DOCUMENTS

| | | |
|---|---|---|
| 5,236,257 A | 8/1993 | Monzaki et al. |
| 5,658,056 A | 8/1997 | Rischen et al. |
| 6,554,459 B2 * | 4/2003 | Yu .......................... F16M 11/14 362/401 |
| 8,226,176 B2 | 7/2012 | Hatano |

| | | | |
|---|---|---|---|
| 2003/0038541 A1 | 2/2003 | Suzuki et al. | |
| 2003/0061812 A1 * | 4/2003 | Enomoto ................. B60T 11/16 | 60/562 |
| 2008/0079309 A1 * | 4/2008 | Hatano ................. B60T 8/4081 | 303/113.5 |

FOREIGN PATENT DOCUMENTS

| | | |
|---|---|---|
| EP | 0 699 571 A1 | 3/1996 |
| EP | 1 970 271 A1 | 9/2008 |
| JP | 55-174065 U | 12/1980 |
| JP | S56-168458 U | 12/1981 |
| JP | 58-183341 A | 10/1983 |
| JP | 59-020758 A | 2/1984 |
| JP | 63-40266 U | 3/1988 |
| JP | 6-054926 U | 7/1994 |
| JP | 6-183330 A | 7/1994 |
| JP | H06-183330 A | 7/1994 |
| JP | 2003-062642 A | 3/2003 |
| JP | 2010-023594 A | 2/2010 |
| WO | 99/30945 A1 | 6/1999 |

OTHER PUBLICATIONS

Chinese Office Action, with an issuing date of Oct. 10, 2014, issued in the corresponding CN Patent Application No. 201180054718.3 with an English translation thereof.

Extended European Search Report issued Apr. 9, 2014 in the corresponding EP Patent Application 11841219.6.

\* cited by examiner

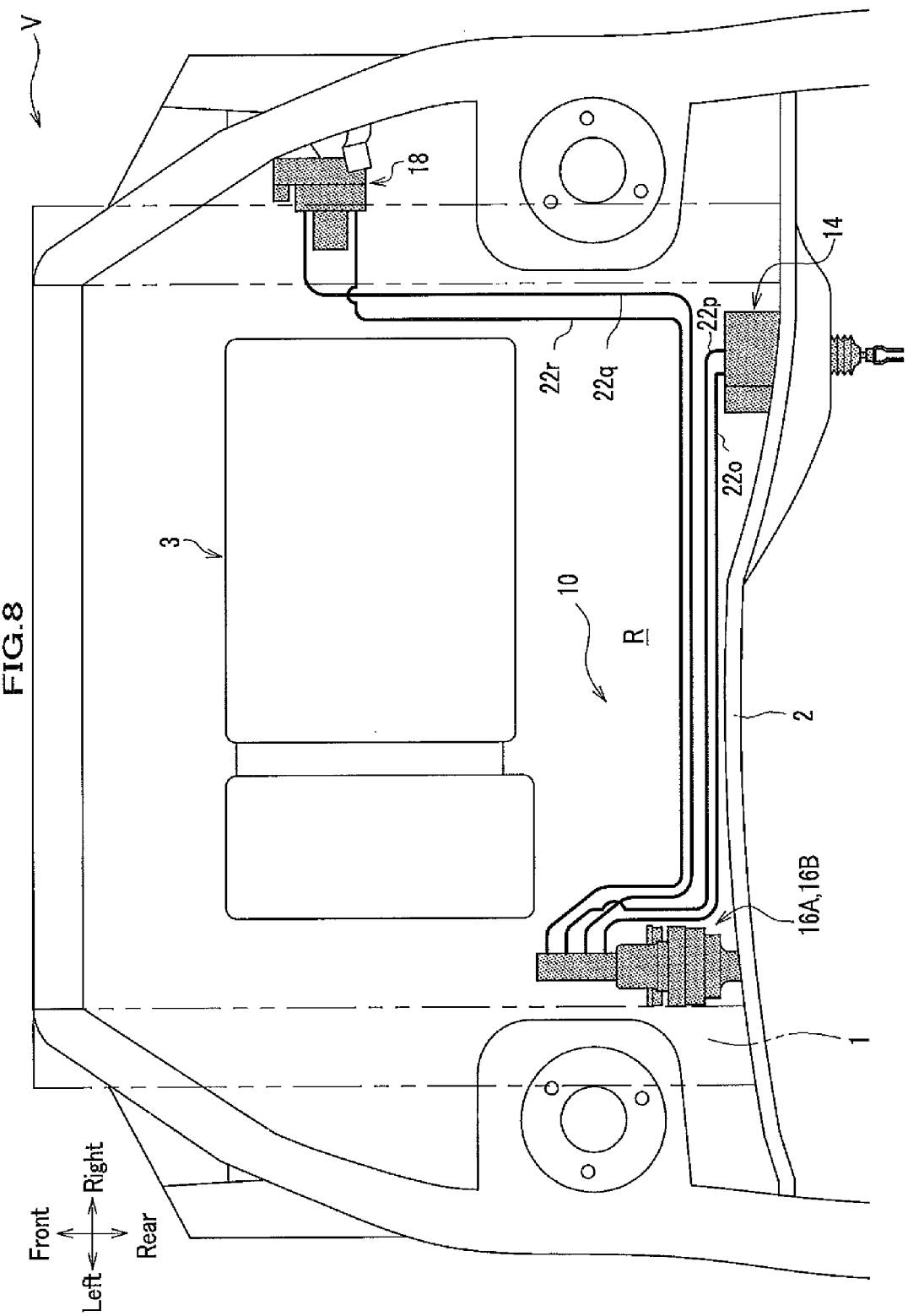

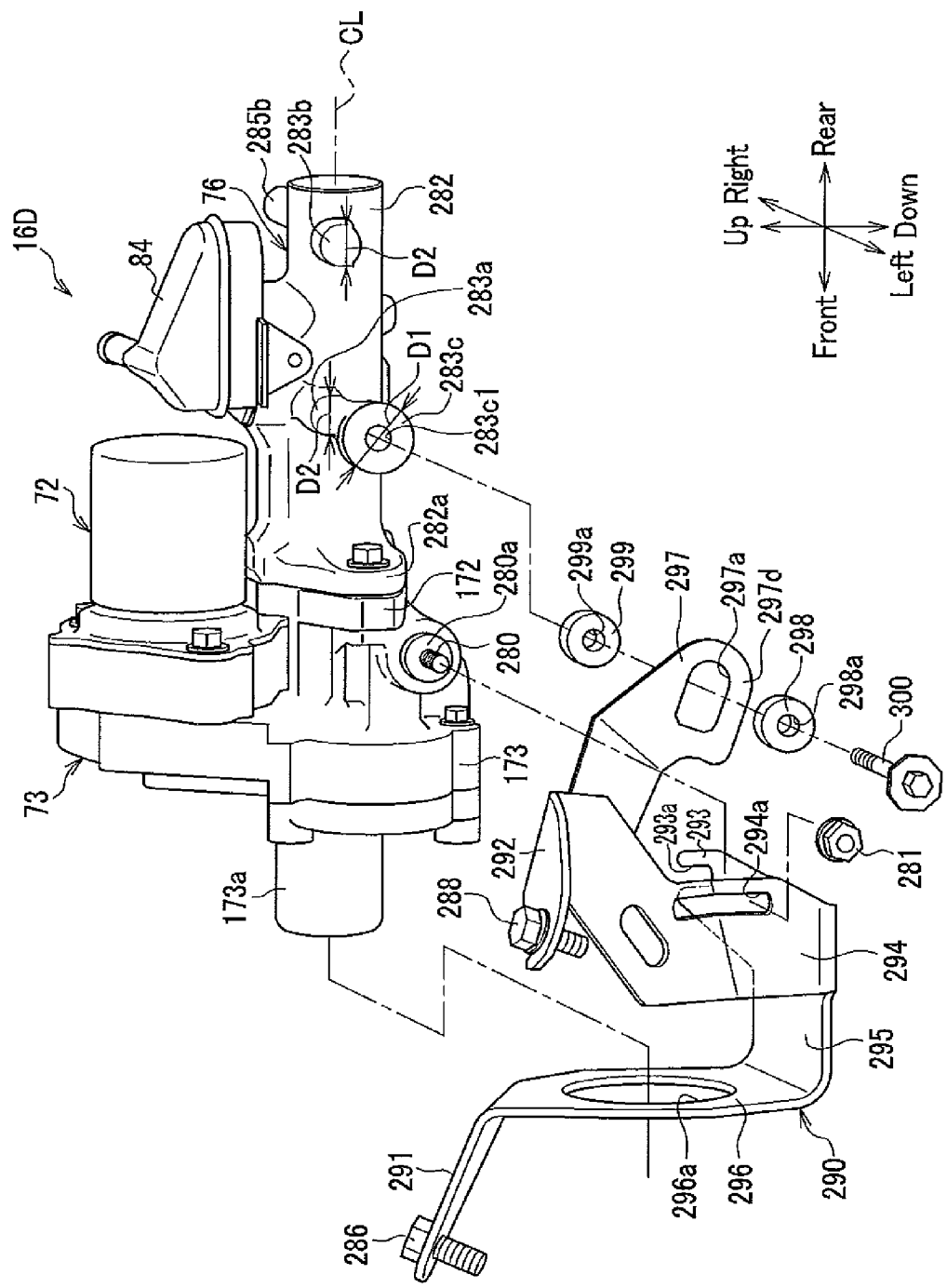

VEHICLE-BODY ATTACHMENT STRUCTURE FOR ELECTRIC BRAKE ACTUATOR

TECHNICAL FIELD

The present invention relates to a vehicle-body attachment structure for an electric brake actuator of a vehicle brake system.

BACKGROUND ART

Conventionally, as brake systems for vehicle (automobile), systems provided with a servo unit, such as a negative pressure booster or a hydraulic booster, are known. Further, in recent years, electric servo units using an electric motor as a boosting source are known (for example, see Patent Document 1).

The electric servo unit disclosed in Patent Document 1 includes a main piston that is moved forward and backward by operation of a brake pedal, a cylindrical booster piston that is fitted outside the main piston such as to be movable relative to the main piston, and a rotation-linear movement conversion mechanism, ball screws for example, for transmitting the rotational force of the electric motor to the booster piston as a booster thrust force.

By this electric servo unit, the main piston and the booster piston are used as pistons for a master cylinder, and the respective front ends are located in the pressure chamber of the master cylinder. Thus, an input thrust force applied to the main piston from a brake pedal by an operator and a booster thrust force applied from an electric motor to the booster piston can generate a hydraulic brake pressure in the master cylinder.

BACKGROUND ART DOCUMENT

Patent Document

Patent Document 1: JP2010-23594 A

DISCLOSURE OF THE INVENTION

Problems to be Solved by the Invention

However, for the electric servo unit disclosed by Patent Document 1, as the master cylinder is formed as a part protruding from the device, a mount portion is necessary at the part of the master cylinder, wherein the mount portion is used to attach the device to a vehicle body. However, a manufacturing process for forming (processing) such a mount portion is an extremely troublesome task.

The present invention solves the above-described conventional problems. An object of the invention is to provide a vehicle-body attachment structure for an electric brake actuator, wherein the mount portion can be easily formed.

Means for Solving the Problems

The present invention provides a vehicle attachment structure for an electric brake actuator for a vehicle brake system including an input device to which braking operation by an operator is input and an electric brake actuator for generating a hydraulic brake pressure, based on at least an electric signal according to the braking operation,
 wherein the electric actuator includes:
 an actuator mechanism configured to generate a driving force, based on the electric signal; and
 a cylinder mechanism configured to apply a pressure to brake fluid by moving a piston along an axial direction by the driving force transmitted from the actuator mechanism,
 wherein the cylinder mechanism is in advance provided with a plurality of unprocessed bosses,
 and wherein one of the bosses is formed for a mount for attaching the electric brake actuator to a vehicle body, and another boss is formed for a port communicating with the cylinder mechanism.

Thus, because a plurality of bosses are provided in advance on a cylinder mechanism, a process, for a port, of the boss on one side into a port/ports, and performing processing, for a mount, of a boss on a side not used as a port (stub boss side) into a second mount portion, it is unnecessary to additionally form a mount portion on the electric brake actuator. Further, as it is only required, for example, to provide a screw hole for fastening by a bolt on the stub boss side, processing of the mount portion becomes easy.

There is provided a vehicle attachment structure, for an electric brake actuator, according to the present invention, wherein the bosses for processing into the ports are provided on both sides with respect to a vehicle transverse direction.

Thus, in a case of accessing from the lower side or the upper side of a vehicle body, it is easy to access respective bosses on the mount side and the port side.

There is provided a vehicle attachment structure, for an electric brake actuator, according to the present invention,
 wherein the boss for the mount is provided on an outer side with respect to the vehicle transverse direction,
 and wherein the bosses for the ports are provided on an inner side with respect to the vehicle transverse direction.

Thus, for example, in a case of mounting on the left side of a vehicle body (side frame), as it is possible to make the space on the right side of the electric brake actuator be larger than that on the left side, it is easy to perform maintenance, such as attaching/detaching a pipe for hydraulic pressure.

There is provided a vehicle attachment structure, for an electric brake actuator, according to the present invention, wherein the bosses to be processed into the ports are formed upward and downward along a vertical direction.

Thus, by using the boss facing downward as a mount and the boss facing upward as a port, even when air has mixed in during fitting or replacing a pipe for hydraulic pressure connected to the cylinder mechanism, it is easy to discharge such air from the cylinder mechanism.

There is provided a vehicle attachment structure, for an electric brake actuator, according to the present invention, wherein an input port to which the brake fluid is input and an output port from which the brake fluid is output are formed at the same boss for a port.

Thus, as it is unnecessary to individually form an input port and an output port, processing of a port becomes easy.

Advantageous Effect of the Invention

According to the present invention, it is possible to provide a vehicle attachment structure for an electric brake actuator, wherein the structure enables easy forming of a mount portion.

BRIEF DESCRIPTION OF THE DRAWINGS

FIGS. 7A and 7B show the motor cylinder device, wherein FIG. 7A is a top view and FIG. 7B is a front view;

FIG. 8 shows a disposition configuration of a vehicle brake system in a vehicle, wherein a vehicle-body attachment structure, in a modified example, for a motor cylinder device is applied to the vehicle brake system;

FIGS. 10A and 10B show a motor cylinder device in another modified example, wherein FIG. 10A is a front view, and FIG. 10B is a cross-sectional view taken when a cylinder mechanism is cut at the position of a port;

FIG. 13 is an exploded perspective view showing the vehicle-body attachment structure for the motor cylinder device;

FIGS. 14A, 14B, and 14C are perspective views showing only a bracket for attaching the motor cylinder device to a vehicle body, wherein FIG. 14A is a view from obliquely front, FIG. 14B is a view from above, and FIG. 14C is a view from the axial direction;

EMBODIMENTS FOR CARRYING OUT THE INVENTION

Figure 1:
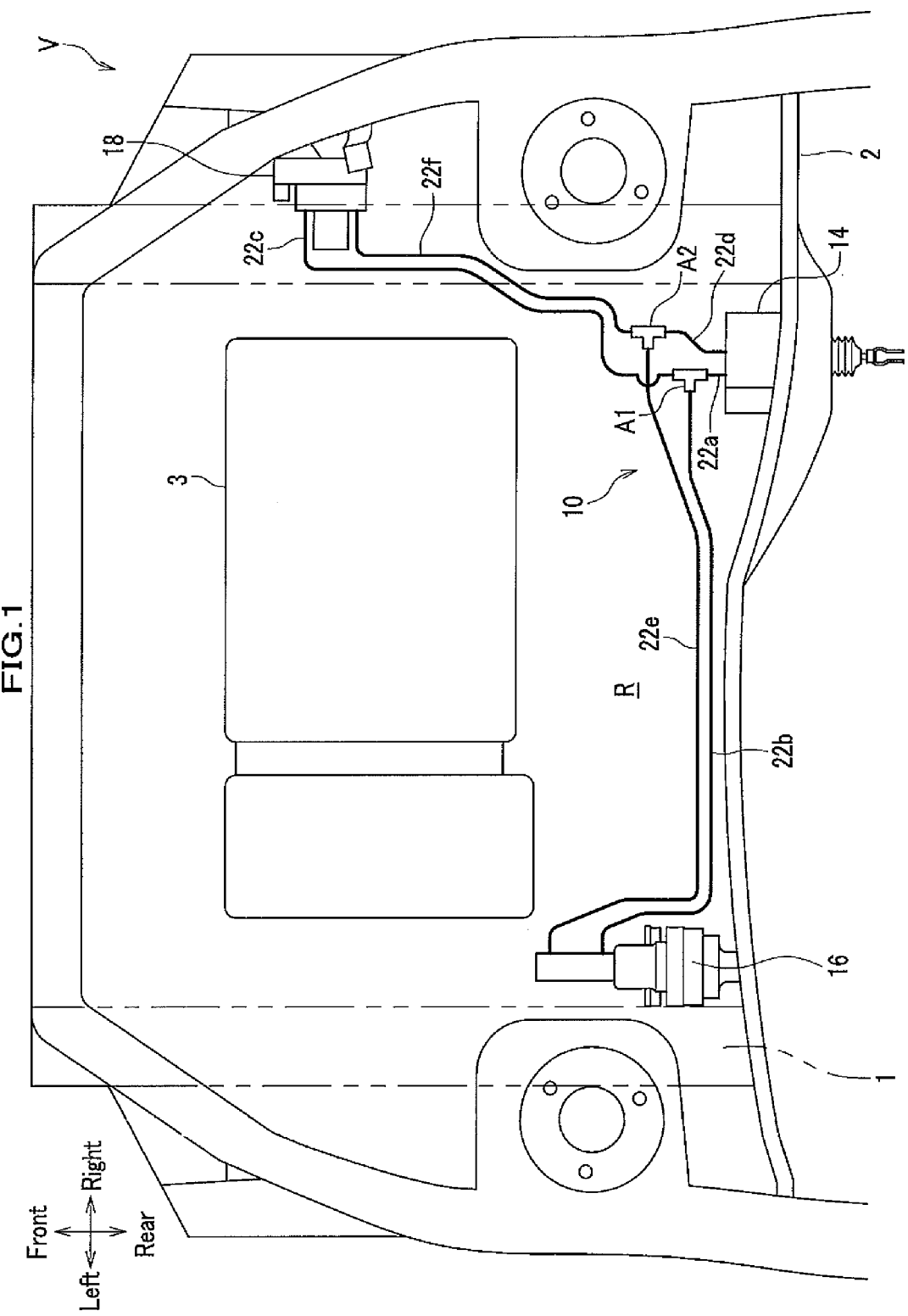
FIG. 1 shows a disposition configuration of a vehicle brake system in a vehicle, wherein a vehicle-body attachment structure, in an embodiment according to the invention, for a motor cylinder device is applied to the vehicle brake system.

In the following, an embodiment according to the present invention will be described in detail, referring to the drawings, as appropriate.

FIG. 1 shows a disposition configuration of a vehicle brake system in a vehicle V, wherein a vehicle-body attachment structure, in the embodiment according to the invention, for an electric brake actuator is applied to the vehicle brake system. The front-rear and left-right directions of the vehicle V are represented by arrows in FIG. 1.

A vehicle brake system 10 shown in FIG. 1 includes two brake systems one of which is a brake system of a by-wire type for a normal use, which operates a brake by transmitting an electric signal, and the other one is a brake system of a conventional hydraulic type for fail-safe, which operates a brake by transmitting a hydraulic pressure.

Accordingly, the vehicle brake system 10 is configured with an input device 14 for inputting a braking operation by an operator, a motor cylinder device 16 as an electric brake actuator for generating a hydraulic brake pressure, based on at least an electric signal according to the braking operation, and a vehicle stability assist device 18 (hereinafter, referred to as the VSA device 18, VSA: registered trademark) as a vehicle behavior stabilizer for assisting stabilization of the behavior of the vehicle, based on the hydraulic brake pressure generated by the motor cylinder device 16.

The input device 14, the motor cylinder device 16, and the VSA device 18 are disposed in an engine room (a structure mounting room) R where structures 3, such as an engine, a driving motor, and the like, provided ahead a dashboard 2 of the vehicle V are mounted, being separated from each other with piping tubes 22a-22f therebetween. Further, as a by-wire brake system, the input device 14 and the motor cylinder device 16 are electrically connected with control means, not shown, by a harness, not shown.

Incidentally, the motor cylinder device 16 may be provided with means for generating a hydraulic pressure, based on an electric signal according to a different physical amount, without being limited to an electric signal according to a braking operation by a driver. An electrical signal according to a different physical amount refers to a signal, by an automatic brake system for example, for avoiding collision of the vehicle V, based on determination by an ECU (Electronic Control Unit) with a sensor or the like on a state around the vehicle V, without depending on a braking operation by a driver.

The VSA device 18 is configured to include functions, for example, an ABS (antilock brake system) function to prevent a wheel lock in braking, a TCS (traction control system) function to prevent spin-off of wheels in accelerating or the like, and a function to reduce transverse sliding in turning. The VSA device 18 is attached to the vehicle body at the right end, with respect to the transverse direction of the vehicle, on the front side, for example, through a bracket. Incidentally, herein, the vehicle behavior stabilizer is not limited to the VSA device 18, and may be an ABS device having only an ABS (Antilock Brake System) function to prevent wheel lock in braking.

Figure 2:
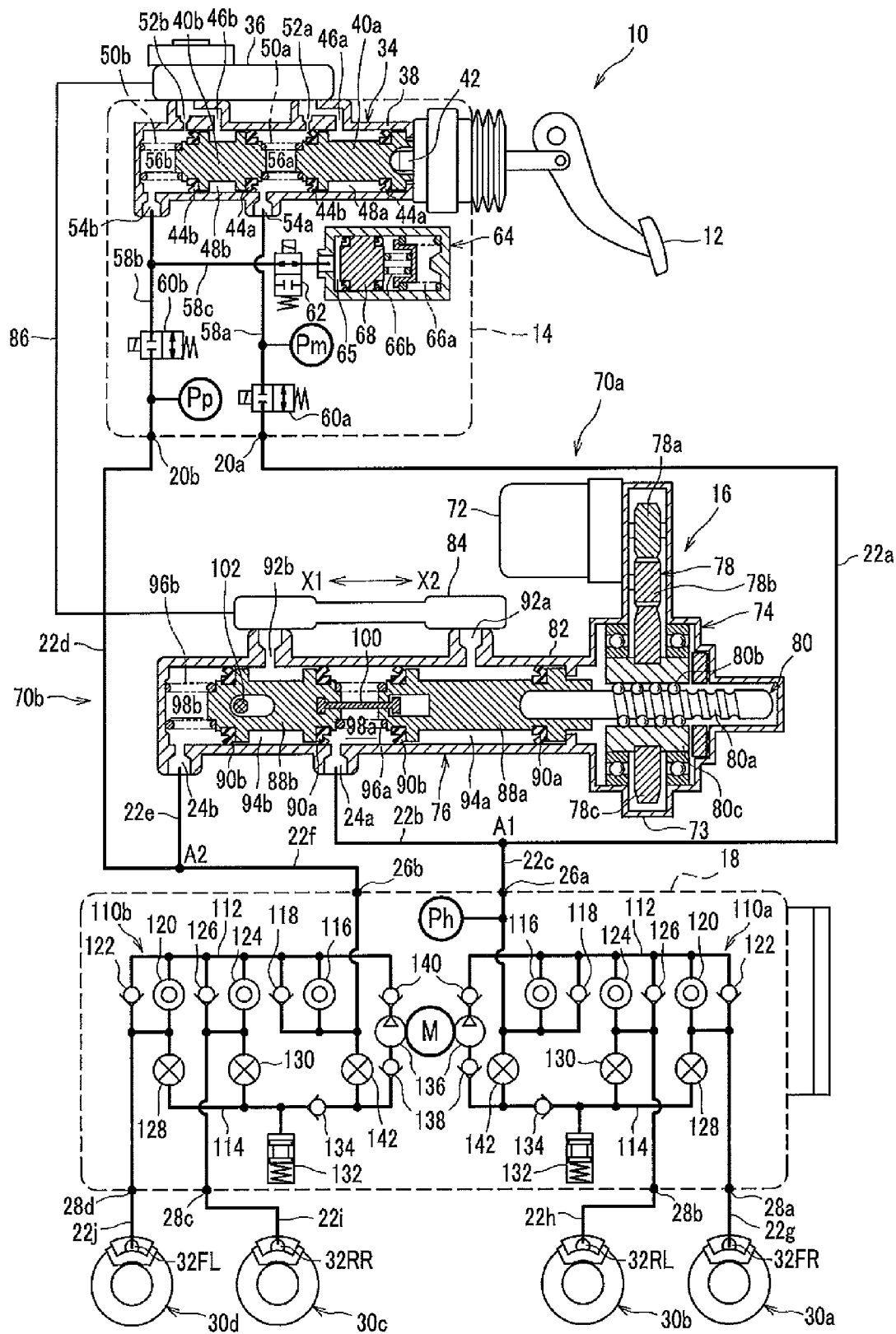
FIG. 2 is a schematic configuration diagram showing the vehicle brake system.

FIG. 2 is a schematic configuration diagram showing the vehicle brake system 10.

Regarding hydraulic passages, with a connection point A1 in FIG. 2 as a reference, a connection port 20a of the input device 14 and the connection point A1 are connected by a first piping tube 22a. Further, an output port 24a of the motor cylinder device 16 and the connection point A1 are connected by a second piping tube 22b. Still further, an inlet port 26a of the VSA device 18 and the connection point A1 are connected by a third piping tube 22c.

With another connection point A2 in FIG. 2 as a reference, another connection port 20b of the input device 14 and the connection point A2 are connected by a fourth piping tube 22d. Further, another output port 24b of the motor cylinder device 16 and the connection point A2 are connected by a fifth piping tube 22e. Still further, another inlet port 26b of the VSA device 18 and the connection point A2 are connected by a sixth piping tube 22f.

The VSA device 18 is provided with a plurality of outlet ports 28a to 28d. The first outlet port 28a is connected, by a seventh piping tube 22g, with a wheel cylinder 32FR of a disk brake mechanism 30a provided at the front wheel on the right side. The second outlet port 28b is connected, by an eighth piping tube 22h, with a wheel cylinder 32RL of a disk brake mechanism 30b provided at the rear wheel on the left side. The third outlet port 28c is connected, by a ninth piping tube 22i, with a wheel cylinder 32RR of a disk brake mechanism 30c provided at the rear wheel on the right side.

The fourth outlet port 28d is connected, by a tenth piping tube 22j, with a wheel cylinder 32FL of a disk brake mechanism 30d provided at the front wheel on the left side.

In this case, brake fluid is supplied through the piping tubes 22g-22j connected with the respective outlet ports 28a-28d to the respective wheel cylinders 32FR, 32RL, 32RR, and 32FL of the disk brake mechanisms 30a-30d. A rise in the hydraulic pressure in the wheel cylinders 32FR, 32RL, 32RR, or 32FL operates the wheel cylinders 32FR, 32RL, 32RR, or 32FL, and a braking force is applied to the corresponding wheel (the right-side front wheel, the left-side rear wheel, the right-side rear wheel, or the left-side front wheel).

The vehicle brake system 10 is arranged to be mountable on various vehicles including, for example, a vehicle driven only by an engine (internal combustion engine), a hybrid vehicle, an electric vehicle, and a fuel cell vehicle. The vehicle brake system 10 can be applied to any of a front wheel drive vehicle (FF), a rear wheel drive vehicle (FR), a four wheel drive vehicle (4WD), or the like.

The input device 14 includes a tandem master cylinder 34 capable of generating a hydraulic pressure by a driver's (operator's) operation of the brake pedal 12 and a first reservoir 36 provided at the master cylinder 34. Inside a cylinder tube 38 of the master cylinder 34, two pistons 40a and 40b are slidably arranged, wherein the two pistons 40a and 40b are separated from each other with a certain distance along the axial direction of the cylinder tube 38. The one piston 40a is disposed adjacent to the brake pedal 12 and is connected with the brake pedal 12 through a push rod 42. The other piston 40b is disposed with a longer distance than the piston 40a from the brake pedal 12.

A pair of piton packings 44a and 44b are respectively attached to the outer circumferential surfaces of the one and the other pistons 40a and 40b through an annular stepped portion. Back chambers 48a and 48b communicated with later-described supply ports 46a and 46b are formed between the pair of packings 44a and 44b. Further, a spring member 50a is arranged between the one and the other pistons 40a and 40b. Another spring member 50b is arranged between the other piston 40b and the side end portion of the cylinder tube 38. Incidentally, instead of providing piston packings 44a and 44b on the outer circumferential surfaces of the pistons 40a and 40b, packings may be attached to the inner circumferential surface of the cylinder tube 38.

The cylinder tube 38 of the master cylinder 34 is provided with two supply ports 46a and 46b, two relief ports 52a and 52b, and two output ports 54a and 54b. In this case, the respective supply ports 46a (46b), and the respective relief ports 52a (52b), are arranged to respectively join with each other and communicate with a reservoir chamber, not shown, in the first reservoir 36.

Further, inside the cylinder tube 38 of the master cylinder 34, a first pressure chamber 56a and a second pressure chamber 56b are provided to generate a hydraulic brake pressure according to a braking effort applied by the driver (operator) to the brake pedal 12. The first pressure chamber 56a is arranged such as to communicate with the connection port 20a through a first hydraulic passage 58a. The second pressure chamber 56b is arranged such as to communicate with the other connection port 20b through a second hydraulic passage 58b.

A pressure sensor Pm is provided between the master cylinder 34 and the connection port 20a and on the upstream side of the first hydraulic passage 58a. A first shut-off valve 60a of a solenoid valve of a normally open type is provided on the downstream side of the first hydraulic passage 58a. This pressure sensor Pm detects the hydraulic pressure on the upstream side, which is on a side of the master cylinder 34 of the first shut-off valve 60a, on the first hydraulic passage 58a.

Between the master cylinder 34 and the other connection port 20b, a second shut-off valve 60b of a solenoid valve of a normally open type is arranged on the side upstream from the second hydraulic passage 58b, and a pressure sensor Pp is arranged on the side downstream from the second hydraulic passage 58b. On the second hydraulic passage 58b, this pressure sensor Pp detects the hydraulic pressure on the downstream side of the second shut-off valve 60b, in other words, on the side of the wheel cylinders 32FR, 32RL, 32RR, and 32FL with respect to the second shut-off valve 60b.

The normal openness of the first shut-off valve 60a and the second shut-off valve 60b refers to the type of a valve configured such that the normal position (the position of the valve body during demagnetization (when current is not applied)) is in a state of being at an open position (always open). Incidentally, in FIG. 2, the first shut-off valve 60a and the second shut-off valve 60b are shown in a state during magnetization (A later-described third shut-off valve 62 is similar).

At a point between the master cylinder 34 and the second shut-off valve 60b, the second hydraulic passage 58b is provided with a branched hydraulic passage 58c branching from the second hydraulic passage 58b. On the branched hydraulic passage 58c, serially connected are a third shut-off valve 62 of a solenoid valve of a normally close type and a stroke simulator 64. The normal closing of the third shut-off valve 62 refers to the type of a valve configured such that the normal position (the position of the valve body during demagnetization (when current is not applied)) is in a state of being at a closed position (always closed).

The stroke simulator 64 is disposed on the second hydraulic passage 58b and on a side of the master cylinder 34 of the second shut-off valve 60b. The stroke simulator 64 is provided with a hydraulic pressure chamber 65 communicating with the branched hydraulic passage 58c, and is arranged such as to be able to suck brake fluid let out through the hydraulic pressure chamber 65 from the second pressure chamber 56b of the master cylinder 34.

Further, the stroke simulator 64 includes a first return spring 66a with a larger spring constant, a second return spring 66b with a smaller spring constant, the first and the second springs 66a and 66b being serially disposed with each other, and a simulator piston 68 pressurized by the first and second return springs 66a and 66b. The stroke simulator 64 is arranged such that the increase gradient of the pedal reaction force is set low during an early stage of pedaling the brake pedal 12, and the pedal reaction force is set high during a later stage of pedaling, so that the pedal feeling of the brake pedal 12 becomes equivalent to an existing master cylinder.

The configuration of the hydraulic passages is roughly categorized into a first hydraulic system 70a that connects the first pressure chamber 56a of the master cylinder 34 and the plurality of wheel cylinders 32FR and 32RL, and a second hydraulic system 70b that connects the second pressure chamber 56b of the master cylinder 34 and the plurality of wheel cylinders 32RR and 32FL.

The first hydraulic system 70a is configured with the first hydraulic passage 58a connecting the output port 54a of the master cylinder 34 (cylinder tube 38) of the input device 14 and the connection port 20a, the piping tubes 22a and 22b connecting the connection port 20a of the input device 14 and the output port 24a of the motor cylinder device 16, the piping tubes 22b and 22c connecting the output port 24a of the motor cylinder device 16 and the inlet port 26a of the VSA device 18, and the piping tubes 22g and 22h connecting the outlet ports 28a and 28b of the VSA device 18 and the respective wheel cylinders 32FR and 32RL.

The second hydraulic system 70b includes the second hydraulic passage 58b connecting the output port 54b of the master cylinder 34 (cylinder tube 38) of the input device 14 and the other connection port 20b, the piping tubes 22d and 22e connecting the other connection port 20b of the input device 14 and the output port 24b of the motor cylinder device 16, the piping tubes 22e and 22f connecting the output port 24b of the motor cylinder device 16 and the inlet port 26b of the VSA device 18, and the piping tubes 22i and 22j for connecting the outlet ports 28c and 28d of the VSA device 18 and the respective wheel cylinders 32RR and 32FL.

As a result, by forming the hydraulic passages by the first hydraulic system 70a and the second hydraulic system 70b, the respective wheel cylinders 32FR and 32RL, and the respective wheel cylinders 32RR and 32FL, can be independently operated so that braking forces which are independent from each other can be generated.

The motor cylinder device 16 includes an actuator mechanism 74 having an electric motor 72 and a driving force transmission section 73, and a cylinder mechanism 76 driven by the actuator mechanism 74. Further, the driving force transmission section 73 of the actuator mechanism 74 includes a gear mechanism (decelerating mechanism) 78 for transmitting the rotational driving force of the electric motor 72, and a ball screw assembly 80 including a ball screw shaft 80a and balls 80b, wherein the ball screw assembly 80 converts this rotational driving force into a linear driving force.

The cylinder mechanism 76 includes the cylinder main body 82 in a cylindrical shape and a second reservoir 84 arranged at the cylinder main body 82. The second reservoir 84 is connected by a piping tube 86 with the first reservoir 36 arranged at the master cylinder 34 of the input device 14. Brake fluid reserved in the first reservoir 36 is supplied to the second reservoir 84 through the piping tube 86.

The first slave piston 88a and the second slave piston 88b are slidably arranged inside the cylinder main body 82, wherein the slave pistons 88a and 88b are separated from each other with a certain distance along the axial direction of the cylinder main body 82. The first slave piston 88a is disposed adjacent to a side of the ball screw assembly 80, is in contact with one end portion of the ball screw shaft 80a, and moves in the direction arrow X1 or X2 integrally with the ball screw shaft 80a. The second slave piston 88b is disposed farther than the slave piston 88a from a side of the ball screw assembly 80.

A pair of slave piston packings 90a and 90b are attached on the outer circumferential surfaces of the first and second slave pistons 88a and 88b through an annular stepped portion. A first back chamber 94a and a second back chamber 94b are formed, which are respectively communicated with later-described reservoir ports 92a and 92b, are formed between the pair of the slave piston packings 90a and 90b. Further, a first return spring 96a is arranged between the first and second slave pistons 88a and 88b, and a second return spring 96b is arranged between the second slave piston 88b and the side end portion of the cylinder main body 82.

The cylinder main body 82 of the cylinder mechanism 76 is provided with the two reservoir ports 92a and 92b and the two output ports 24a and 24b. In this case, the reservoir port 92a (92b) is arranged such as to communicate with a reservoir chamber, not shown, in the second reservoir 84.

A first hydraulic pressure chamber 98a is provided in the cylinder main body 82 to generate a hydraulic brake pressure that is output from the output port 24a to a side of the wheel cylinders 32FR and 32RL. Further, a second hydraulic pressure chamber 98b is provided in the cylinder main body 82 to generate a hydraulic brake pressure that is output from the other output port 24b to a side of the wheel cylinders 32RR and 32FL.

Restricting means 100 is provided between the first slave piston 88a and the second slave piston 88b to restrict the maximum stroke and the minimum stroke of the slave piston 88a and the slave piston 88b. Further, the second slave piston 88b is provided with a stopper pin 102 that restricts the sliding range of the second slave piston 88b, and inhibits over return of the slave piston 88b to a side of the slave piston 88a. The restricting means 100 and the stopper pin 102 prevent a defect of another system at the time of a defect of one system, particularly at the time of backup when braking is carried out by a hydraulic brake pressure generated by the master cylinder 34.

The VSA device 18 is a known one and includes a first brake system 110a for control of the first hydraulic system 70a connected to the disk brake mechanisms 30a and 30b (wheel cylinders 32FR and 32RL) for the right-side front wheel and the left-side rear wheel. Further, the VSA device 18 includes a second brake system 110b for control of the second hydraulic system 70b connected to the disk brake mechanisms 30c and 30d (wheel cylinders 32RR and 32FL) for the right-side rear wheel and the left-side rear wheel. Incidentally, the first brake system 110a may be formed by a hydraulic system connected to disk brake mechanisms arranged at the left-side front wheel and the right-side front wheel, and the second brake system 110b may be formed by a hydraulic system connected to disk brake mechanisms arranged at the left-side rear wheel and the right-side rear wheel. Further, the first brake system 110a may be formed by a hydraulic system connected to disk brake mechanisms arranged at the right-side front wheel and the right-side rear wheel on one side of the vehicle body, and the second brake system 110b may be formed by a hydraulic system connected to disk brake mechanisms arranged at the left-side front wheel and the left-side rear wheel on the other one side of the vehicle body.

As the first brake system 110a and the second brake system 110b have the same structure, elements corresponding between the first brake system 110a and the second brake system 110b are designated with the same reference symbols. In the following, the first brake system 110a will be mainly described while describing the second brake system 110b with bracketed notes.

The first brake system 110a (the second brake system 110b) has a first shared hydraulic passage 112 and a second shared hydraulic passage 114 shared by the wheel cylinders 32FR and 32RL (32RR and 32FL). The VSA device 18 includes a regulator valve 116, which is a normal-open type solenoid valve disposed between the inlet port 26a and the first shared hydraulic passage 112, a first check valve 118 that is arranged in parallel with the regulator valve 116 to allow the brake fluid to flow from a side of the inlet port 26a to a side of the first shared hydraulic passage 112 (while inhibiting the brake fluid from flowing from the side of the first shared hydraulic passage 112 to the side of the inlet port 26a), and a first invalve 120, which is a normally open type solenoid valve disposed between the first shared hydraulic passage 112 and the first outlet port 28a. Further, the VSA device 18 includes a second check valve 122 that allows the brake fluid to flow from the first outlet port 28a side to a side of the first shared hydraulic passage 112 (while inhibiting the brake fluid from flowing from the side of the first shared hydraulic passage 112 to a side of the second outlet port 28b), the second check valve 122 being arranged parallel with the first invalve 120, a second invalve 124, which is a normally open type solenoid valve disposed between the first shared hydraulic passage 112 and the second outlet port 28b, and a third check valve 126 that allows the brake fluid to flow from the side of the second outlet port 28b to the side of the first shared hydraulic passage 112 (while inhibiting the brake fluid from flowing from the side of the first shared hydraulic passage 112 to the side of the second outlet port 28b), the third check valve 126 being arranged parallel to the second invalve 124.

Still further, the VSA device 18 includes a first outvalve 128, which is a normally closed type solenoid valve disposed between the first outlet port 28a and the second shared hydraulic passage 114, a second outvalve 130, which is a normally closed type solenoid valve disposed between the second outlet port 28b and the second shared hydraulic passage 114, a reservoir 132 connected to the second shared hydraulic passage 114, a fourth check valve 134 that is disposed between the first shared hydraulic passage 112 and the second shared hydraulic passage 114 to allow the brake fluid to flow from a side of thesecond shared hydraulic passage 114 to the side of the first shared hydraulic passage 112 (while inhibiting the brake fluid from flowing from the side of the first shared hydraulic passage 112 to the second shared hydraulic passage 114 side), a pump 136 that is disposed between the fourth check valve 134 and the first shared hydraulic passage 112 to supply the brake fluid from the side of the second shared hydraulic passage 114 to the side of the first shared hydraulic passage 112, a suction valve 138 and a discharge valve 140 provided before and after the pump 136 to allow the brake fluid to flow from the side of the second shared hydraulic passage 114 to the side of the first shared hydraulic passage 112 (while inhibiting the brake fluid from flowing from the side of the first shared hydraulic passage 112 to the side of the second shared hydraulic passage 114), a motor M for driving the pump 136, and a suction valve 142 disposed between the second shared hydraulic passage 114 and the inlet port 26a.

Incidentally, in the first brake system 110a, a pressure sensor Ph is provided on the hydraulic passage adjacent to the inlet port 26a to detect the hydraulic brake pressure having been generated by the first hydraulic pressure chamber 98a of the motor cylinder device 16 and output from the output port 24a of the motor cylinder device 16. Detection signals detected by the respective pressure sensors Pm, Pp, and Ph are introduced to control means, not shown.

The vehicle brake system 10 in the present embodiment is basically configured as described above, and the operation and advantages thereof will be described below.

During normal operation when the vehicle brake system 10 normally functions, the first shut-off valve 60a and the second shut-off valve 60b, which are normally open type solenoid valves, turn into a valve close state by being magnetically excited, and the third shut-off valve 62, which is a normally closed type solenoid valve, turns into a valve open state by being magnetically excited (see FIG. 2). Accordingly, as the first hydraulic system 70a and the second hydraulic system 70b are shut off by the first shut-off valve 60a and the second shut-off valve 60b, it does not occur that a hydraulic brake pressure generated by the master cylinder 34 of the input device 14 is transmitted to the wheel cylinders 32FR, 32RL, 32RR, and 32FL of the disk brake mechanisms 30a-30d.

At this moment, a hydraulic brake pressure generated by the second pressure chamber 56b of the master cylinder 34 is transmitted through the branched hydraulic passage 58c and the third shut-off valve 62 in the valve open state to the hydraulic pressure chamber 65 of the stroke simulator 64. The hydraulic brake pressure supplied to the hydraulic pressure chamber 65 displaces the simulator piston 68 against the spring forces of the springs 66a and 66b, and a stroke of the brake pedal 12 is thereby allowed and a pseudo petal reaction force is generated to be applied to the brake pedal 12. As a result, a brake feeling without a strange feeling for a driver can be obtained.

In such a system state, when the control means, not shown, has detected pedaling of the brake pedal 12 by the driver, the control means drives the electric motor 72 of the motor cylinder device 16 to urge the actuator mechanism 74, and displaces the first slave piston 88a and the second slave piston 88b toward the direction arrow X1 in FIG. 2 against the spring forces of the first return spring 96a and the second return spring 96b. By the displacements of the first slave piston 88a and the second slave piston 88b, the hydraulic brake pressures inside the first hydraulic pressure chamber 98a and the second hydraulic pressure chamber 98b are increased, balancing with each other, and a desired hydraulic brake pressure is thus generated.

These hydraulic brake pressures of the first hydraulic pressure chamber 98a and the second hydraulic pressure chamber 98b in the motor cylinder device 16 are transmitted through the first invalve 120 and the second invalve 124 of the VSA device 18 which are in the valve open state, to the wheel cylinders 32FR, 32RL, 32RR, and 32FL of the disk brake mechanisms 30a-30d. By operation of the wheel cylinders 32FR, 32RL, 32RR, and 32FL, desired braking forces are applied to the respective wheels.

In other words, by the vehicle brake system 10 in the present embodiment, during a normal state when the motor cylinder device 16, which functions as an electric brake actuator (hydraulic pressure source for power), control means such as an ECU, not shown, for by-wire control, and the like are operable, a so-called brake by-wire type brake system becomes active wherein in a state that communications between the master cylinder 34, which generates a hydraulic brake pressure by an operator's pedaling of the brake pedal 12, and the disk brake mechanisms 30a-30d (wheel cylinders 32FR, 32RL, 32RR, an 32FL) that brake the respective wheels are shut off by the first shut-off valve 60a and the second shut-off valve 60b, the disk brake mechanisms 30a-30d are operated by the hydraulic brake pressure generated by the motor cylinder device 16. Accordingly, the present embodiment can be suitably applied to a vehicle, such as an electric vehicle or the like, in which a negative pressure that could be caused by a conventional internal combustion engine does not exist.

On the other hand, during an abnormal state when the motor cylinder device 16 or the like is inoperable, a so-called conventional hydraulic type brake system becomes active, wherein the first shut-off valve 60a and the second shut-off valve 60b are respectively made in a valve open state, and the third shut-off valve 62 is made in a valve close state so as to transmit a hydraulic brake pressure generated by the master cylinder 34 to the disk brake mechanisms 30a-30d (wheel cylinders 32FR, 32RL, 32RR, 32FL) and thereby operate the disk brake mechanisms 30a-30d (wheel cylinders 32FR, 32RL, 32RR, and 32FL).

Figure 3:
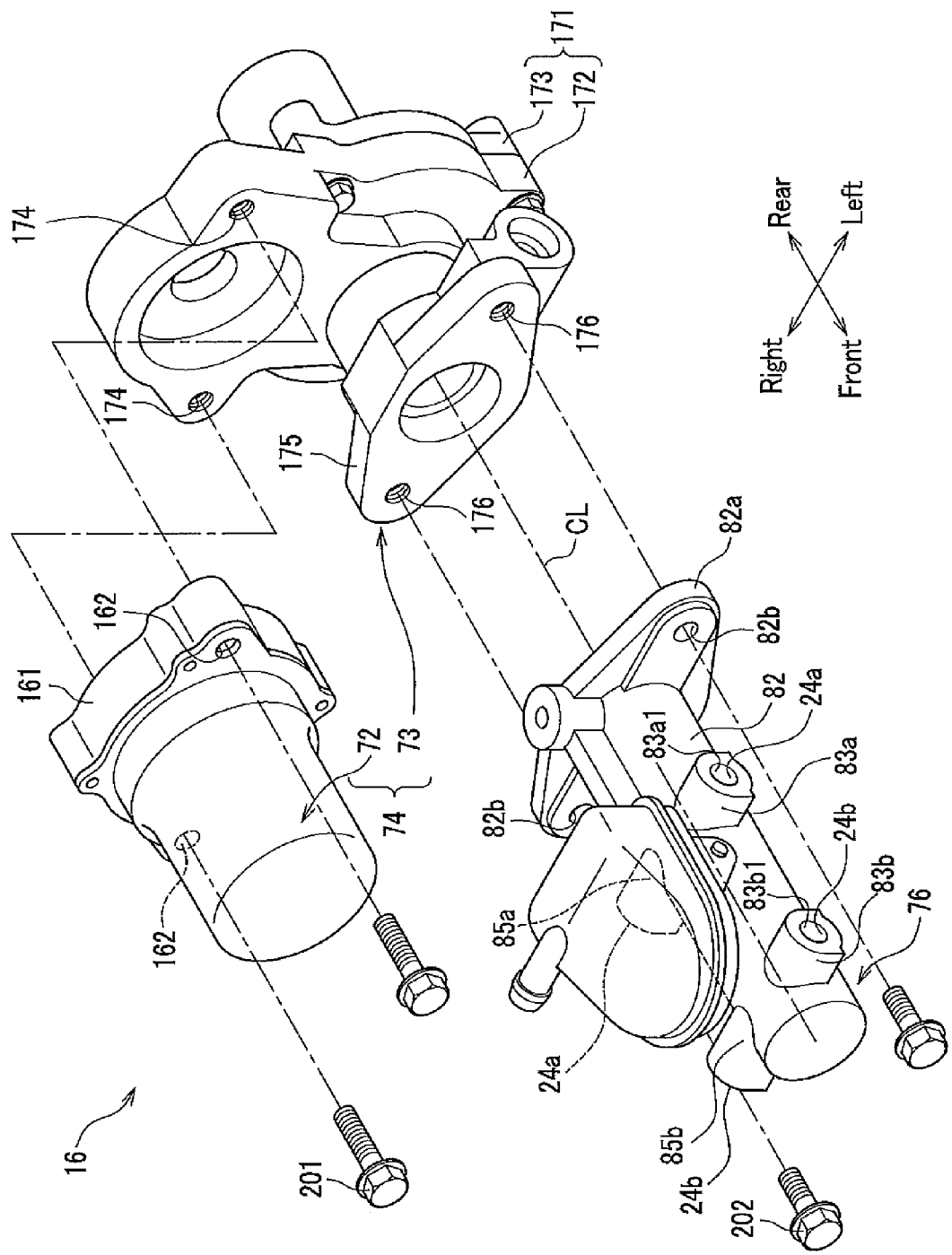
FIG. 3 is an exploded perspective view of the motor cylinder device.
Figure 4:
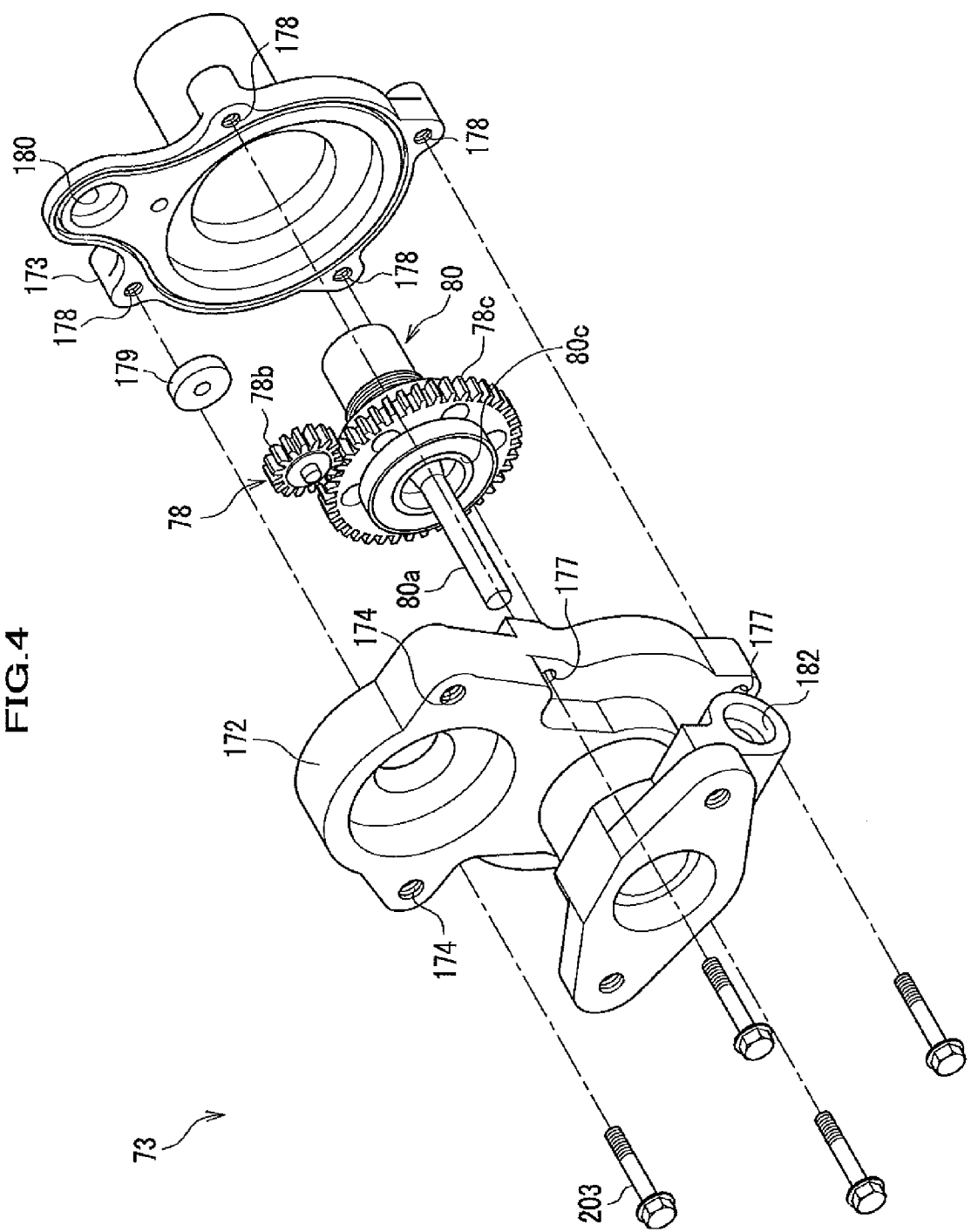
FIG. 4 is an exploded perspective view of a driving force transmission section.
Figure 5:
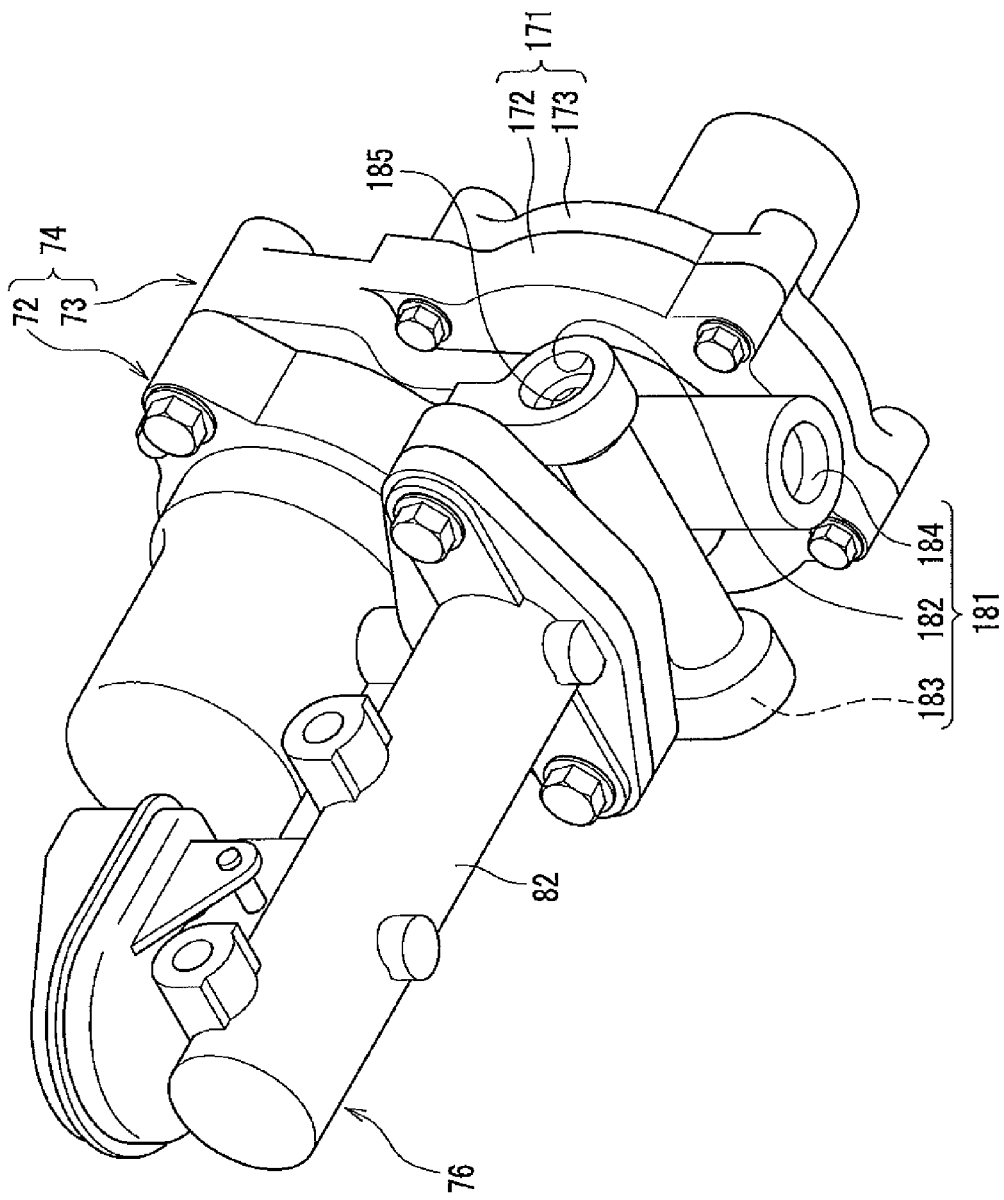
FIG. 5 is a perspective view of the motor cylinder device in a view from obliquely below.
Figure 6:
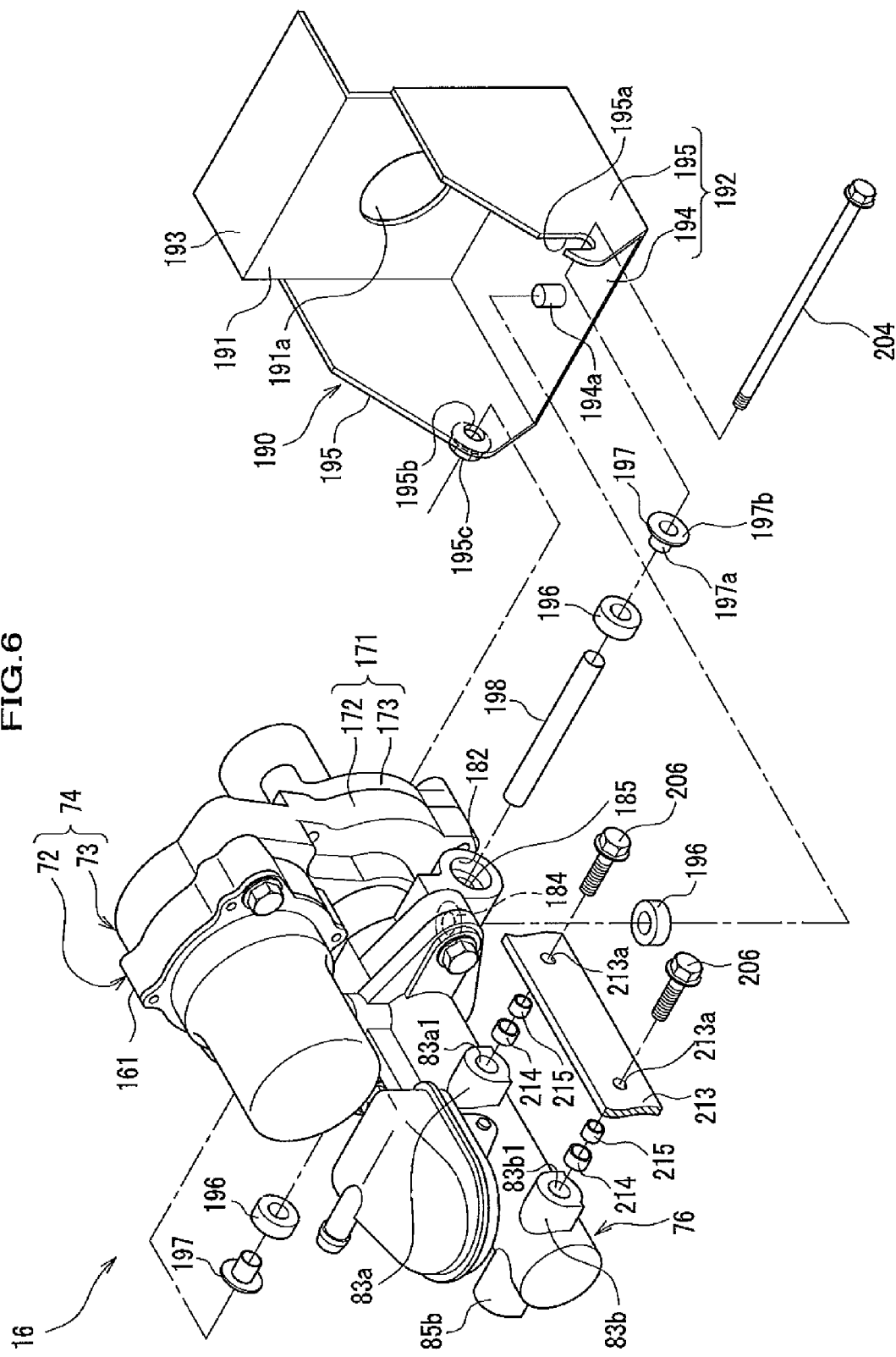
FIG. 6 is an exploded perspective view for illustrating a method of attaching the motor cylinder device to a vehicle body.
Figure 7A:
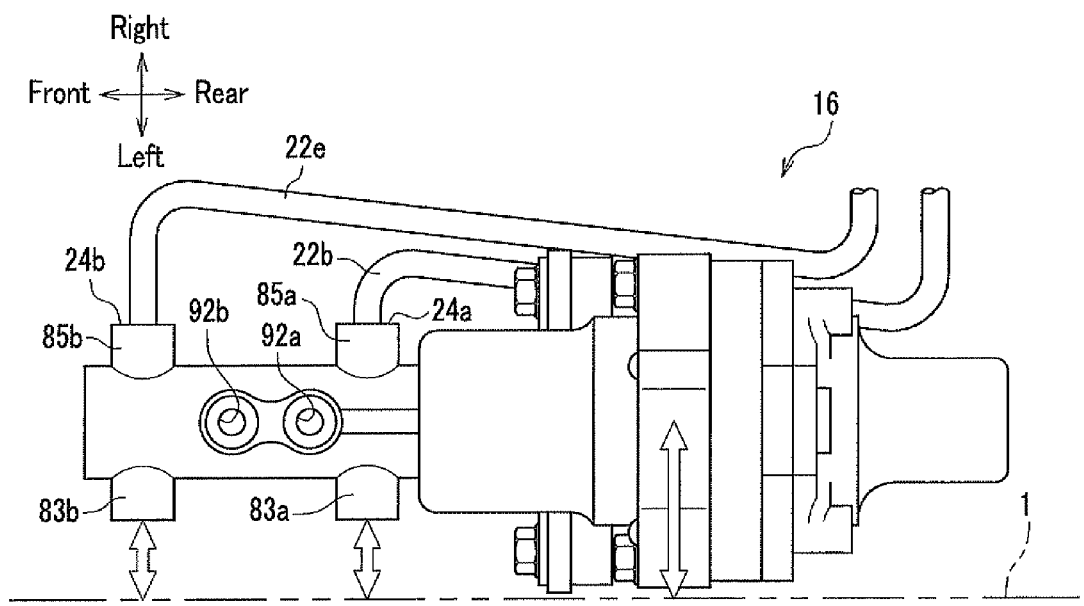
Figure 7B:
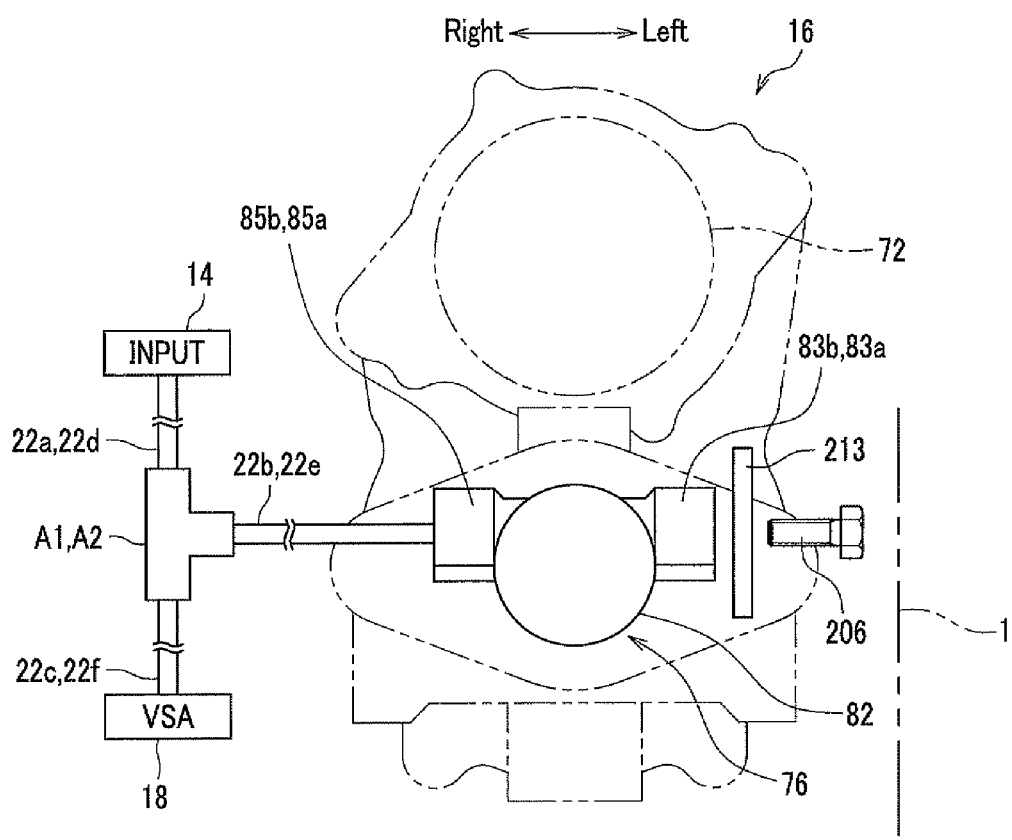

In the following, the motor cylinder device 16 will be described in further detail. FIG. 3 is an exploded perspective view of the motor cylinder device. FIG. 4 is an exploded perspective view of the driving force transmission section. FIG. 5 is a perspective view of the motor cylinder device in a view from obliquely below. FIG. 6 is an exploded perspective view for illustrating a method of attaching the motor cylinder device to a vehicle body. FIGS. 7A and 7B show a side view of the motor cylinder device.

As shown in FIG. 3, the motor cylinder device 16 includes the electric motor 72 that is driven, based on an electric signal from the control means, not shown, the driving force transmission section 73 for transmitting a driving force generated by the electric motor 72, and the cylinder mechanism 76 for applying a pressure to the brake fluid by moving the first and second slave pistons 88a and 88b (see FIG. 2) along the axial direction by the driving force transmitted from the driving force transmission section 73. Incidentally, the electric motor 72 and the driving force transmission section 73 construct an actuator mechanism 74 set forth in claims.

The electric motor 72, the driving force transmission section 73, and the cylinder mechanism 76 are arranged separable from each other. The electric motor 72 has a base portion 161 connected with a harness, not shown, and the base portion 161 is provided with a plurality of penetration holes 162 which bolts 201 penetrate. Further, the end portion, on a side of the driving force transmission section 73, of the cylinder main body 82 of the cylinder mechanism 76 is provided with a flange portion 82a having a plurality of penetration holes 82b which bolts 202 penetrate.

The driving force transmission section 73 has a casing body 171 for housing driving force transmitting mechanical elements (not shown), such as a gear mechanism, a ball screw assembly, and the like. The casing body 171 includes a housing 172 disposed on a side of the cylinder mechanism 76 and a cover 173 for covering the opening end of the housing 172, the opening end being on the side opposite to the cylinder mechanism 76. The housing 172 and the cover 173 of the driving force transmission section 73 are formed from a metal, such as an aluminum alloy (The material for the cylinder main body 82 of the cylinder mechanism 76 is similar).

The housing 172 of the driving force transmission section 73 is provided with motor attaching screw holes 174 for attaching the electric motor 72 to the driving force transmission section 73 at positions corresponding to the penetration holes 162. Further, a flange portion 175 is arranged at the end portion, on the side of the cylinder mechanism 76, of the housing 172 that is provided, at positions corresponding to the penetration holes 82b, with cylinder mechanism attaching screw holes 176 for attaching the cylinder mechanism 76 to the driving force transmission section 73.

Further, the housing 172 of the driving force transmission section 73 is provided with a motor attachment surface 172a facing the axial direction of the cylinder mechanism 76, the base portion 161 of the electric motor 72 being attached to the motor attaching surface 172a. Further, the flange portion 175 of the housing 172 is provided with a cylinder mechanism attaching surface 172b facing the axial direction of the cylinder mechanism, the flange portion 82a of the cylinder mechanism 76 being attached to the cylinder mechanism attaching surface 172b. The cylinder mechanism attaching surface 172b is formed protruding toward the side of the cylinder mechanism 76 more than the motor attaching surface 172a is. Still further, the motor attaching surface 172a is formed above the cylinder mechanism attaching surface 172b, and the electric motor 72 is disposed above the cylinder mechanism 76.

The cylinder mechanism 76 has the cylinder main body 82 substantially in a cylindrical shape. The flange portion 82a is formed at the base end of the cylinder main body 82, and bosses 83a, 83b, 85a, and 85b are formed protruding at the front end side with a distance along the axial direction (central axis CL) from each other. The bosses 83a and 83b are formed facing outside (left side) with respect to the vehicle transverse direction, and the bosses 85a and 85b are formed facing inner side (right side) with respect to the vehicle transverse direction.

The bosses 83a and 83b are processed for a second mount portion (for a mount) and are formed substantially in a cylindrical shape. The bosses 83a and 83b are provided with circular mount holes 83a1 and 83b1 from the tip end surface toward the inner side of the cylinder mechanism 76. Incidentally, though not shown, each of the mount holes 83a1 and 83b1 has, at the bottom surface thereof, a screw hole into which a later-described bolt 206 (see FIG. 6) is screwed in. Still further, the mount holes 83a1 and 83b1 are formed such as not to communicate with the first hydraulic pressure chamber 98a nor the second hydraulic pressure chamber 98b in the cylinder main body 82.

On the other hand, the bosses 85a and 85b are processed for ports and formed substantially in a cylindrical shape. The boss 85a is provided with an output port 24a such as to communicate with the first hydraulic pressure chamber 98a in the cylinder main body 82. The boss 85b is provided with an output port 24b such as to communicate with the second hydraulic pressure chamber 98b in the cylinder main body 82.

The electric motor 72 is attached to the driving force transmission section 73 and fixed, by making bolts 201 penetrate through the penetration holes 162 and thus screwing the bolts 201 into the motor attaching screw holes 174. The cylinder mechanism 76 is attached to the driving force transmission section 73 and fixed, by making the bolts 202 penetrate through the penetration holes 82b and thus screwing the bolts 202 into the cylinder mechanism attaching screw holes 176.

As shown in FIG. 4, the gear mechanism 78 and the ball screw assembly 80 are housed in the casing body 171 (see FIG. 3). The gear mechanism 78 includes a pinion gear 78a (see FIG. 2) fixed to the output shaft of the electric motor 72, an idle gear 78b engaging with the pinion gear 78a, and a ring gear 78c engaging with the idle gear 78b. The ball screw assembly 80 includes the ball screw shaft 80a whose front end side is connected with the first slave piston 88a, balls 80b (see FIG. 2) disposed in the thread groove on the ball screw shaft 80a, and a nut portion 80c screw-engaged with the ball screw shaft 80a through the balls 80b.

The nut portion 80c is fixed to the inner circumferential surface of the ring gear 78c, for example by pressure fitting; a rotational driving force transmitted from the gear mechanism 78 is thereby input to the nut portion 80c; the rotational driving force is thereafter converted into a linear driving force by the ball screw assembly 80; and the ball screw shaft 80a can thus move forward and backward along the axial direction.

The housing 172 and the cover 173 of the casing body 171 are arranged separable from each other. The housing 172 is provided with a plurality of penetration holes 177 which the bolts 203 penetrate, wherein the penetration holes 177 are disposed around the central axis CL (see FIG. 3) of the first and second slave pistons 88a and 88b (see FIG. 2). A plurality of housing attaching screw holes 178 are formed at positions, of the cover 173, corresponding to the penetration holes 177. By making the bolts 203 penetrate the penetration holes 177 and thereby screwing the bolts 203 into the housing attaching screw holes 178, the housing 172 and the cover 173 are joined with each other. Incidentally, the reference symbol 179 in FIG. 4 represents a bearing for rotatably supporting the tip end of the output shaft of the electric motor 72, and the bearing 179 is insertion-fitted to a hole portion 180 formed on the cover 173.

As shown in FIG. 5, the motor cylinder device 16 is provided with a first mount portion 181 to attach the motor cylinder device 16 to a vehicle body 1 (see FIG. 1), for example, at a side frame. In a view from a side of the cover 173 with respect to the central axis CL (see FIG. 3) direction, the first mount portion 181 includes a left mount hole 182 located on the left side, a right mount hole 183 located on the right side, and a lower mount hole 184 arranged downward. The left, right, and lower mount holes 182-184 are respectively formed with a cylindrical recession. Further, the first mount portion 181 has a penetration hole 185 with an axial center perpendicular to the central axis CL (see FIG. 3), wherein the penetration hole 185 is formed along the axial center common to the left mount hole 182 and the right mount hole 183.

The first mount portion 181 is provided in the vicinity of the center of gravity of the motor cylinder device 16. Concretely, the first mount portion 181 is provided at a part where the position of the center of gravity (or the closest part to the center of gravity) of the motor cylinder device 16, out of the electric motor 72, the driving force transmission section 73, and the cylinder mechanism 76, is present, that is at the driving force transmission section 73 in this case. In more detail, the first mount portion 181 is arranged at the housing 172 of the driving force transmission section 73, the housing 172 being provided with the motor attaching screw holes 174 (see FIG. 4). However, the first mount portion 181 can be arranged at any position as long as the position is in the vicinity of the central gravity of the motor cylinder device 16 without being limited to the position of the driving force transmission section 73 nor the housing 172. By such a structure, the vicinity of the center of gravity of the motor cylinder device 16 can be supported and swinging of the motor cylinder device 16 can be reduced even when a force, such as vibration, is applied.

As shown in FIG. 6, the motor cylinder device 16 is attached at the first mount portion 181 (see FIG. 5) thereof to the vehicle body 1 (see FIG. 1), at the side frame for example, through an attaching bracket 190, and is attached at the second mount portion (bosses 83*a* and 83*b*) thereof to the vehicle body 1 (see FIG. 1), at the side frame for example, through an attaching bracket 213.

The attaching bracket 190 is provided with a support plate 192 structured by a pair of side plates 195, 195 for supporting the motor cylinder device 16, the side plates 195, 195 sandwiching the motor cylinder device 16 from the left-right directions by screw fastening with bolts (male screw members) 204, and a bottom plate 194 for supporting the middle portion (central portion) of the motor cylinder device 16 from below, the bottom plate 194 being substantially horizontal and continuous from the bottom sides of the pair of side plates 195, 195. Further, the attaching bracket 190 is provided with a back plate 191 that is substantially along the vertical direction and continuous from the side plates 195, 195 and the bottom plate 194, and provided with a fixing plate 193 for fixing to the vehicle body side, the fixing plate 193 being continuous from the back plate 191. An opening 191*a* which the protrusion portion 173*a* of the cover 173 penetrates is formed close to the center of the back plate 191.

One side plate 195 is provided with a notch 195*a* substantially in a U-shape which a bolt 204 can penetrate, and the other side plate 195 is provided with a penetration hole 195*b* which another bolt 204 penetrates. A nut 195*c*, which can be screw-engaged with the bolt 204, is fixed and attached to the outside of the penetration hole 195*b* of the side plate 195. Further, a pin 194*a* is provided, being standing at the center of the upper surface of the bottom plate 194.

In attaching the motor cylinder device 16 to the attaching bracket 190, used are a first collar 198 in a long cylindrical shape, a rubber bush 196, a second collar 197 having a cylindrical portion 197*a* and a flange 197*b* formed at the end of the cylindrical portion 197*a*, and the bolt 204. The rubber bush 196 is a buffer member of rubber substantially in a cylindrical shape, and is capable of absorbing vibration and shock.

First, the first collar 198 is inserted inside the penetration hole 185 of the attaching bracket 190. Then, each of the second collars 197 having the cylindrical portion 197*a* insertion-fitted inside the central hole of the rubber bush 196 is insertion-fitted inside the left mount hole 182 or the right mount hole 183. Further, the rubber bush 196 is insertion-fitted into the lower mount hole 184 and thus attached. Then, the pin 194*a* is insertion fitted to the central hole of the rubber bush 196 attached to the lower mount hole 184 so that the motor cylinder device 16 is installed on the bottom plate 194 of the attaching bracket 190. Thus, the middle portion of the motor cylinder device 16 is supported from below by the lower mount hole 184.

When the motor cylinder device 16 is installed on the bottom plate 194, the rubber bushes 196 and the second collars 197 attached respectively to the left mount hole 182 and the right mount hole 183 of the motor cylinder device 16 are respectively at the notch 195*a* and the penetration hole 195*b* of the side plates 195. The bolt 204 penetrates through the notch 195*a*, the second collar 197, the rubber bush 196, the first collar 198, the rubber bush 196, and the second collar 197 in this order, and thus can be screwed into the nut 195*c*. At this moment, the bolt 204 comes to penetrate through the penetration hole 185. Thus, by the left mount hole 182 and the right mount hole 183, the motor cylinder device 16 is supported such as to be sandwiched by the pair of side plates 195, 195 from the left and right directions.

Then, the fixing board 193 of the attaching bracket 190 is fixed directly or through a connecting member, not shown, to the vehicle body 1 (see FIG. 1), for example at the side frame, by screw fastening, welding, or the like.

As has been described above, by using the first mount portion 181, it is possible to attach the motor cylinder device 16 to the vehicle body side, supporting the three positions that are on the left, right, and bottom sides, of the motor cylinder device 16. Further, as the first mount portion 181 of the motor cylinder device 16 is floating-supported (elastically supported) on the vehicle body side through the rubber bushes 196, vibration and shock can be absorbed.

On the other hand, the attaching bracket 213 is formed of a steel plate member or the like, and penetration holes 213*a* which fastening bolts 206 can penetrate are formed at positions corresponding to the mount holes 83*a*1 and 83*b*1 of the bosses 83 and 83*b*.

In attaching the motor cylinder device 16 to the attaching bracket 213, used are rubber bushes 214, cylindrical collars 215, and bolts 206. The rubber bushes 214 are rubber buffer members substantially in a cylindrical shape and can absorb vibration and shock, having a shape that allows insertion-fitting into the mount holes 83a1 and 83b1.

First, the collars 215 are insertion-fitted into the central holes of the rubber bushes 214, and the rubber bushes 214 are insertion-fitted by pressed into the mount holes 83a1 and 83b1. Then, the bolts 206 penetrate the penetration holes 213a of the attaching bracket 213 and collars 215, and bolts 206 are screwed into the screw holes (not shown) formed in the mount holes 83a1 and 83b1 so that the motor cylinder device 16 is supported by the attaching bracket 213. Thus, the motor cylinder device 16 is floating-supported by the attaching brackets 213. Incidentally, though not shown, the attaching bracket 213 is formed such as to extend to the vehicle body 1 (see FIG. 1), at the side frame for example, and is fixed directly or through a connecting member, not shown, to the vehicle body 1, by screw fastening, welding, or the like.

As shown in FIG. 7A, the motor cylinder device 16 is fixed through the attaching bracket 213 (see FIG. 7B) in a state, as shown by hollowed arrows, disposed at the side of the vehicle body 1 (see FIG. 1), for example at a side frame extending forward and backward. Concretely, the attaching bracket 213 is formed extending to the vehicle body 1, and is fixed, directly or through a connecting member, not shown, to the vehicle body 1 by screw fastening, welding, or the like.

The second piping tube 22b and the fifth piping tube 22e (hereinafter, abbreviated as piping tubes) in which the brake fluid flows are connected to the output ports 24a and 24b formed at the bosses 85a and 85b of the motor cylinder device 1. The second piping tube 22b and the fifth piping tube 22e are formed by bending a metallic pipe, such as a steel pipe, into a certain shape (same as other piping tubes).

Herein, the cylinder mechanism 76 includes the first hydraulic pressure chamber 98a and the second hydraulic pressure chamber 98b (see FIG. 2) formed in parallel along the central axis CL (see FIG. 3). The output port 24a is the primary port communicating with the first hydraulic pressure chamber 98a and the output port 24b is the secondary port communicating with the second hydraulic pressure chamber 98b.

The second piping tubes 22b and 22e extending from the output ports 24a and 24b along the direction perpendicular to the central axis CL (see FIG. 3) are bent toward the base end side of the cylinder mechanism 76, and arranged thereafter such as to extend toward the motor cylinder device 16 side along the axial direction (the direction of the central axis CL) of the cylinder mechanism 76. Thereafter, the piping tubes 22b and 22e are arranged along the dashboard 2, and connected with the input device 14 and the VSA device 18 through a joint.

As has been described above, in the present embodiment, in the vehicle-body attachment structure of the motor cylinder device 16, unprocessed bosses 83a, 83b, 85a, and 85b are formed on the cylinder mechanism 76 in advance in plural directions (two directions), and one group of bosses 83a and 83b are formed for a mount to attach the motor cylinder device 16 to the vehicle body 1, and the other group of bosses 85a and 85b are formed for ports to communicate with the cylinder mechanism 76 (the first hydraulic pressure chamber 98a and the second hydraulic pressure chamber 98b). Accordingly, it is not necessary to additionally form a mount portion on the cylinder mechanism 76. Further, as it is only required to form mount holes 83a1 and 83b1 having screw holes, for bolt fastening, on the bosses 83a and 83b (stub boss) side, processing of the mount portion is easy.

Further, in the present embodiment, as shown in FIG. 7B, the bosses 83a and 83b for a mount are formed on the outer side (left side) with respect to the vehicle transverse direction and the bosses 85a and 85b are formed on the inner side (right side) with respect to the vehicle transverse direction. Accordingly, when the motor cylinder device 16 is fixed to the side frame (vehicle body 1) at the left front, it is easy to ensure the space on the right side of the motor cylinder device 16 as a larger space compared with the space on the left side. Thus, maintenance such as replacing the second piping tubes 22b and 22e and arranging the second piping tubes 22b and 22e become easy.

Figure 9:
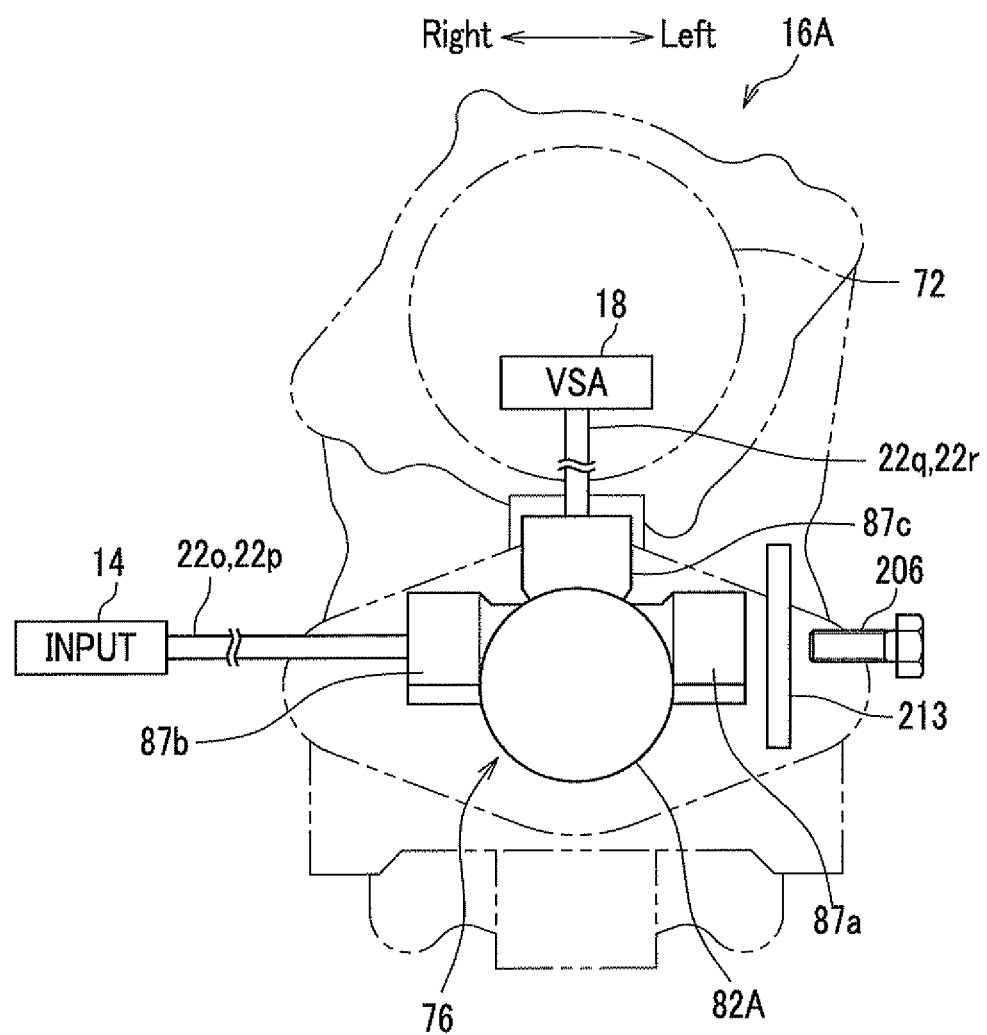
FIG. 9 is a front view of the motor cylinder device in the modified example.

FIG. 8 shows a disposition configuration of a vehicle brake system in a vehicle, wherein a vehicle-body attachment structure, in a modified example, for a motor cylinder device is applied to the vehicle brake system. FIG. 9 is a front view of the motor cylinder device in the modified example. The same reference symbols are assigned to elements as those in the foregoing embodiment, and description will be omitted. Incidentally, the input device 14, the motor cylinder device 16, and the VSA device 18 are disposed similarly to the disposition shown in FIG. 1.

As shown in FIG. 8, a motor cylinder device 16A (16B) is different from the above-described motor cylinder device 16 in that four kinds of piping tubes 22o, 22p, 22q, and 22r are connected. That is, the motor cylinder device 16A (16B) is connected with the connection ports 20a and 20b (see FIG. 2) of the input device 14 through the piping tubes 22o and 22p. Further, the motor cylinder device 16A (16B) is connected with the VSA device 18 through the piping tubes 22q and 22r.

As shown in FIG. 9, the motor cylinder device 16A is provided with bosses 87a, 87b, and 87c in three directions at a cylinder main body 82A of a cylinder mechanism 76. Incidentally, for brevity of description, one of a port corresponding to the first hydraulic pressure chamber 98a and a port corresponding to the second hydraulic pressure chamber 98b will be described with illustration.

The boss 87a is formed for a mount and is protruding toward the outer side (left side) with respect to the vehicle transverse direction. The boss 87b is formed for a port and is protruding toward the inner side (right side) with respect to the vehicle transverse direction. The boss 87c is formed for a port and is protruding upward along the vertical direction. Incidentally, a method of attaching the motor cylinder device 16A to an attaching bracket 213 through the boss 87a can be carried out similarly to the method shown in FIG. 6.

Also for such a vehicle-body attachment structure of the motor cylinder device 16A, the cylinder mechanism 76 is provided in advance with the bosses 87a, 87b, and 87c, wherein one boss 87a is provided for a mount, and the other bosses 87b and 87c are provided for ports. Accordingly, it is not necessary to additionally form a mount portion on the cylinder mechanism 76. Further, as it is only required to form a mount hole having a screw hole for bolt fastening in the boss 87a, processing of the mount portion is easy.

Further, as the boss 87a for mount is formed outside (left side) with respect to the vehicle transverse direction and the bosses 87b and 87c for ports are formed inside (right side) with respect to vehicle transverse direction and upward along the vertical direction, in case of fixing the motor cylinder device 16A to the side frame (vehicle body 1) at the left front, it is easy to ensure the space on the right side and the upper side of the motor cylinder device 16A as a larger space compared with the left side. Thus, maintenance such as replacing the piping tubes 22*o*, 22*p*, 22*q* and 22*r* and disposing the piping tubes 22*o*-22*r* become easy.

Incidentally, the motor cylinder device 16A has been described, taking an example of a case of providing the bosses 87*a*-87*c* on the both sides with respect to the vehicle transverse direction and on the upper side, however, without being limited thereto, the bosses may be provided on the both sides with respect to the vehicle transverse direction and on the lower side.

Figure 10A:
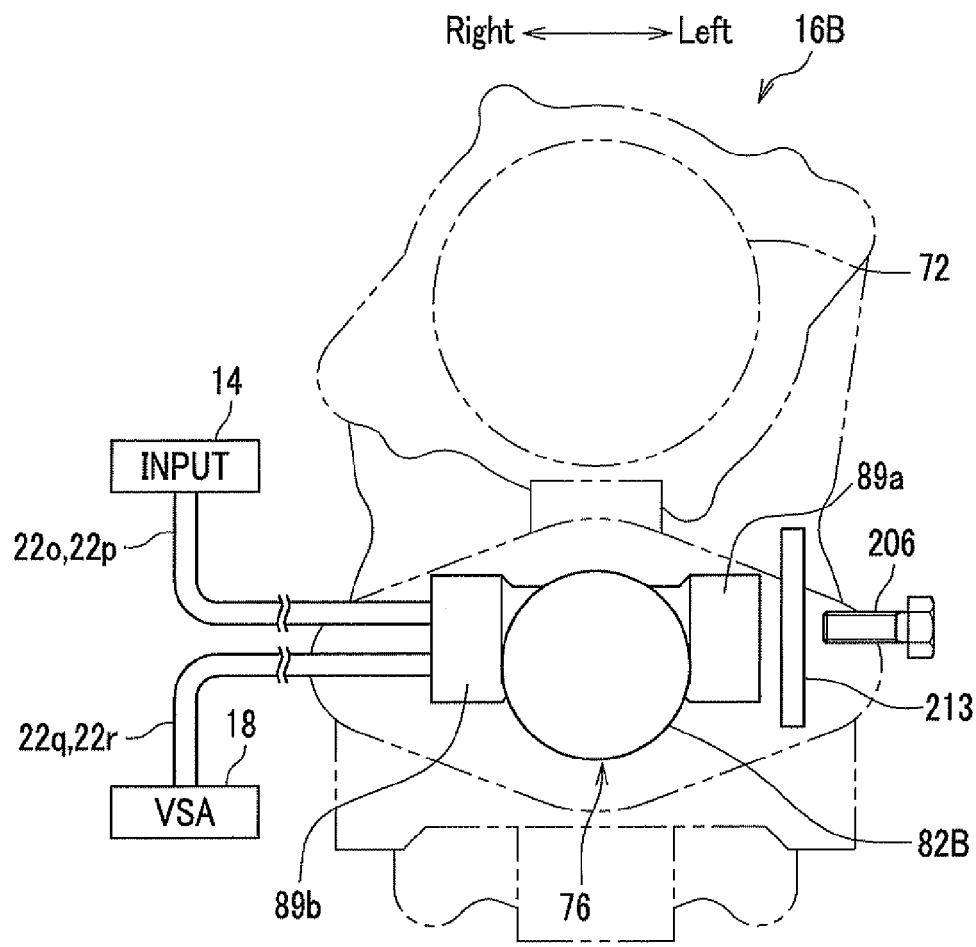
Figure 10B:
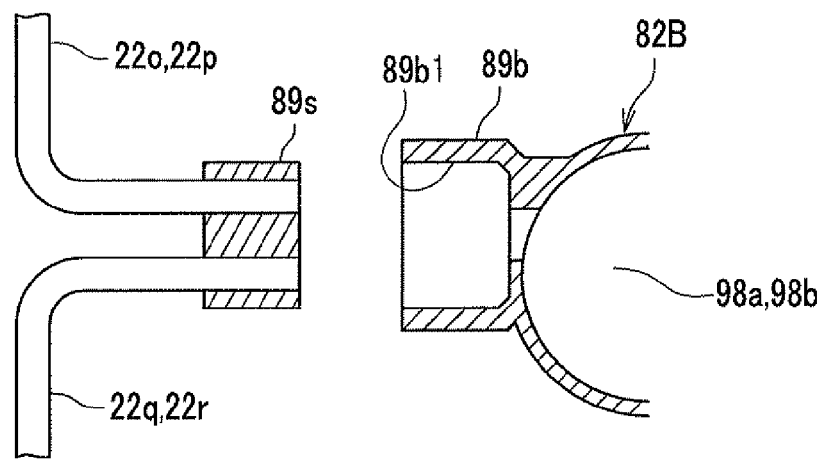

FIGS. 10A and 10B show a motor cylinder device in another modified example, wherein FIG. 10A is a front view, and FIG. 10B is a cross-sectional view taken when a cylinder mechanism is cut at the position of a port.

As shown in FIG. 10A, a motor cylinder device 16B in another modified example is provided with bosses 89*a* and 89*b* in two directions at a cylinder main body 82B of a cylinder mechanism 76. The boss 89*a* is for a mount and protruding toward the outside (left side) with respect to the vehicle transverse direction. The boss 89*b* is for ports and protruding toward the inside (right side) with respect to the vehicle transverse direction. Further, for the motor cylinder device 16B, the input port for input of brake fluid and the output port for output of the brake fluid are formed at the same boss 89*b*. That is, the boss 89*b* is arranged as an input/output port.

Concretely, as shown in FIG. 10B, the boss 89*b* of the cylinder main body 82B is provided with a communication hole 89*b*1 communicating with a first hydraulic pressure chamber 98*a* (the second hydraulic pressure chamber 98*b*). A connector 89*s* is fitted to the end portion of a piping tube 22*o* (22*p*) connected with the input device 14 and the end portion of a piping tube 22*q* (22*r*) connected with the VSA device 18. The connector 89*s* is arranged attachable/detachable to/from the communication hole 89*b*1 through attaching/detaching means, not shown. Arrangement is made such that the piping tubes 22*o* (22*p*) and 22*q* (22*r*) penetrate through the connector 89*s*, and the end portions of the piping tubes 22*o* (22*p*) and 22*q* (22*r*) communicate with the communication hole 89*b*1.

Also for such a vehicle-body attachment structure of the motor cylinder device 16B, the cylinder mechanism 76 is provided in advance with the bosses 89*a* and 89*b*, wherein one boss 89*a* is provided for a mount, and the other boss 89*b* is provided for ports. Accordingly, it is not necessary to additionally form a mount portion on the cylinder mechanism 76. Further, as it is only required to form a mount hole having a screw hole for fastening by a bolt 206 in the boss 89*a*, processing of the mount portion is easy.

Further, as the boss 89*a* for a mount is formed outside (left side) with respect to the vehicle transverse direction and the bosses 89*b* for ports is formed inside (right side) with respect to vehicle transverse direction, in case of fixing the motor cylinder device 16B to the side frame (vehicle body 1) at the left front, it is easy to ensure the space on the right side of the motor cylinder device 16B as a larger space compared with the left side. Thus, maintenance such as replacing the piping tubes 22*o*, 22*p*, 22*q* and 22*r* becomes easy.

Figure 11:
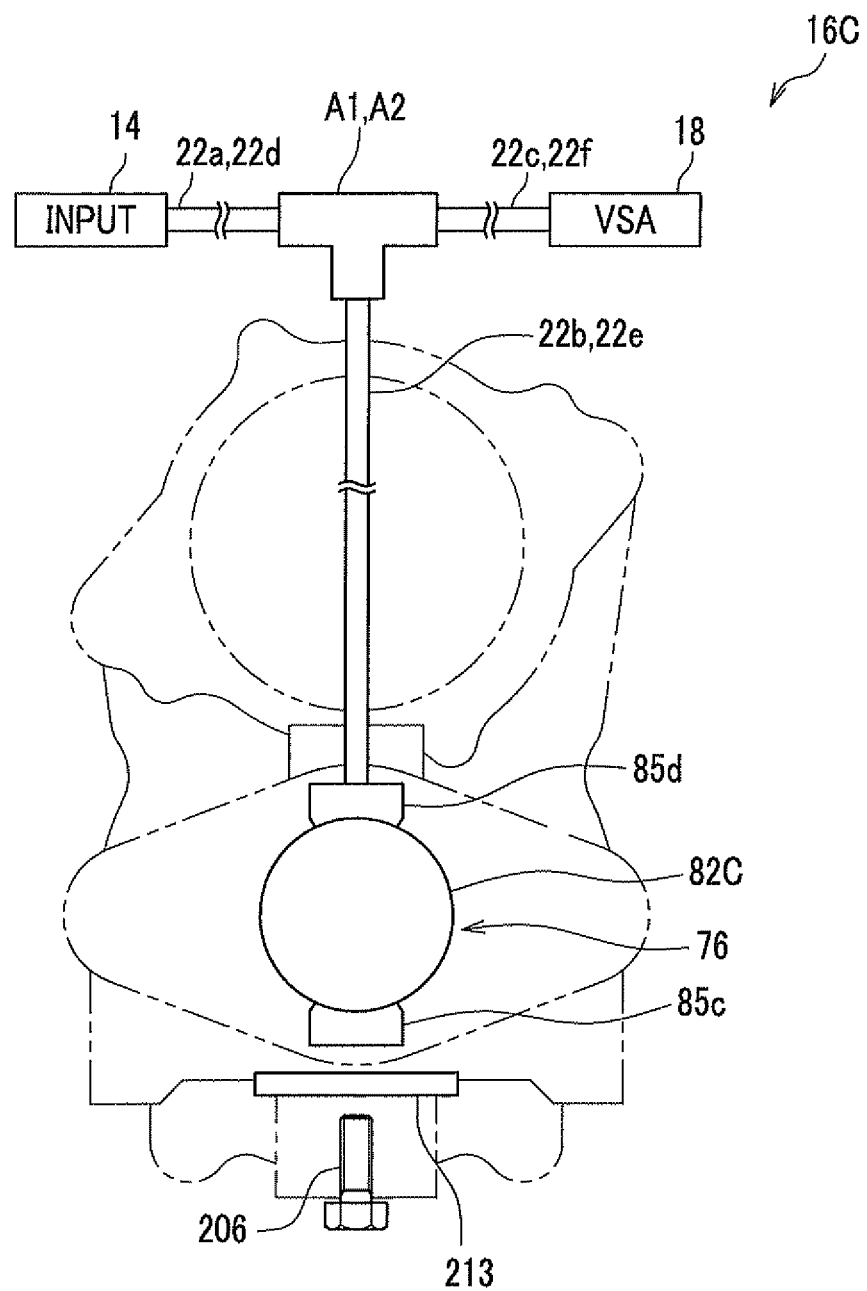
FIG. 11 is a front view showing a motor cylinder device in a still another modified example.

FIG. 11 is a front view showing a motor cylinder device in a still another modified example. A motor cylinder device 16C is provided with bosses 85*c* and 85*d* in two directions at a cylinder main body 82C of a cylinder mechanism 76. The boss 85*c* is for a mount and protruding downward along the vertical direction. The boss 85*d* is for mount and protruding upward along the vertical direction.

Also for such a vehicle-body attachment structure of the motor cylinder device 16B, similarly to the above description, it is not necessary to additionally form a mount portion on the cylinder mechanism 76. Further, processing of the mount portion is easy. Still further, by providing the boss 85*d* on the upper side along the vertical direction, maintenance including replacement of the piping tubes 22*b* and 22*e* is easy. Yet further, by providing the boss 85*d* on the upper side along the vertical direction, even when air has mixed in during fitting of the piping tubes 22*b* and 22*e* to be connected to the cylinder mechanism 76 or replacing the piping tubes 22*b* and 22*e*, it is easy to discharge such air from the cylinder mechanism 76.

Incidentally, a forming pattern of the ports of a cylinder mechanism 76 is not limited to forming ports in two directions at positions facing each other with the cylinder main body 82 between the ports, and ports may be formed in two directions perpendicular to each other at the cylinder main body 82. For example, a boss for a mount may be provided on the outer side with respect to the vehicle transverse direction, and a boss for a port may be provided on the upper side (or the lower side) along the vertical direction. Further, bosses may be provided in four directions, namely upper, lower, left, and right directions with respect to the cylinder main body 82.

Still further, although the foregoing embodiment has been described, taking an example of a case of applying the invention to a right-hand drive vehicle in which the input device 14 is disposed on the right side in the engine room R, the invention may be applied to a left-hand drive vehicle in which the input device 14 is disposed on the left side in the engine room R.

Different Embodiment

Figure 12:
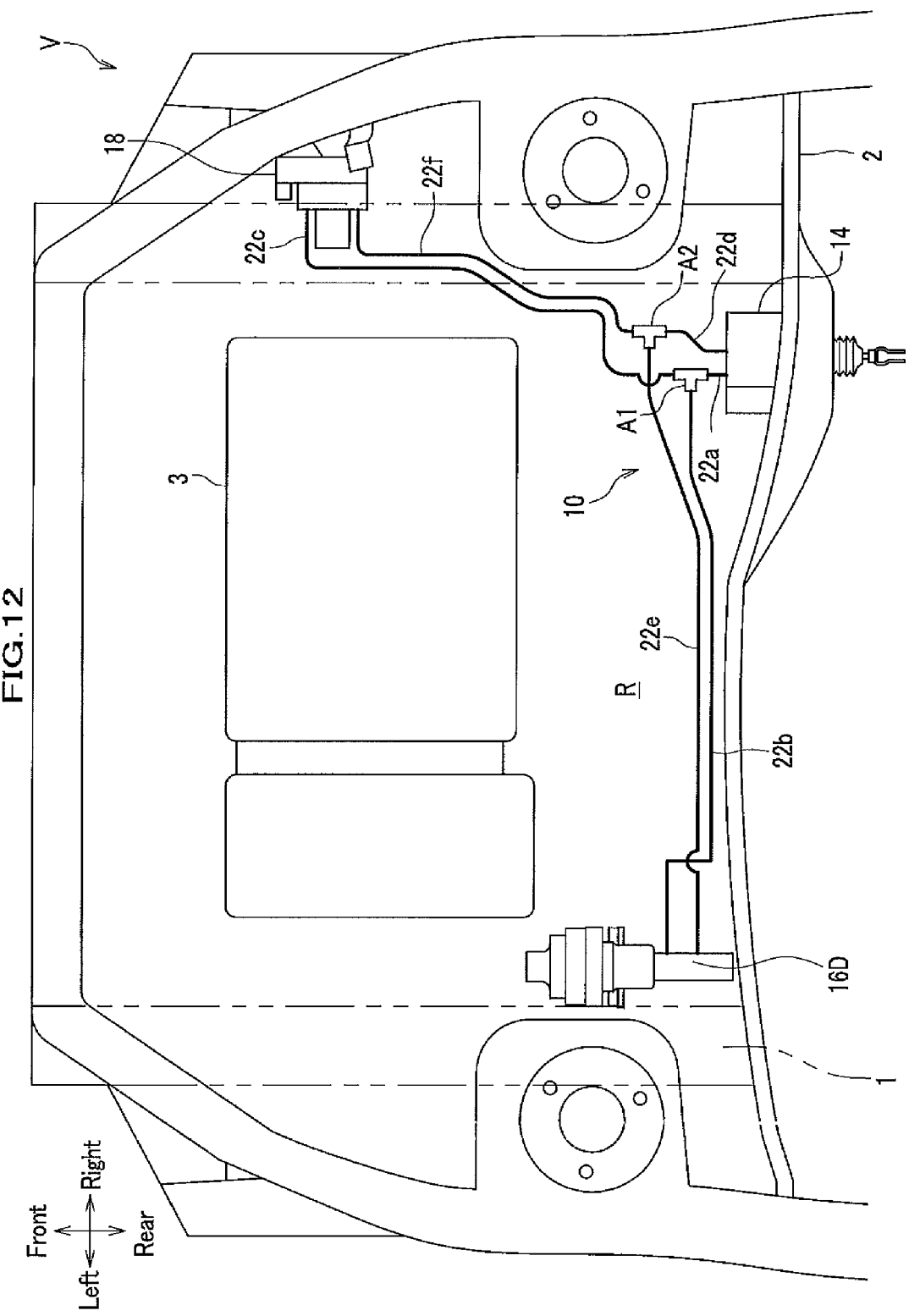
FIG. 12 shows a disposition configuration of a vehicle brake system in a vehicle, wherein a vehicle-body attachment structure, in a different embodiment according to the invention, for a motor cylinder device is applied to the vehicle brake system.

FIG. 12 shows a disposition configuration of a vehicle brake system in a vehicle, wherein a vehicle-body attachment structure, in a different embodiment according to the invention, of a motor cylinder device is applied to the vehicle brake system. A vehicle brake system 10 shown in FIG. 12 has a vehicle-body attachment structure of a motor cylinder device 16D instead of the vehicle-body attachment structure of the above-described motor cylinder device 16. Incidentally, the same reference symbols are assigned to elements similar to those of the vehicle-body attachment structure of the above-described motor cylinder device 16, and overlapping description will be omitted. This motor cylinder device 16D is attached to a side frame (vehicle body) 1 in reverse to that of the above-described motor cylinder device 16 in terms of a front-rear direction.

FIG. 13 is an exploded perspective view showing the vehicle-body attachment structure of the motor cylinder device. This motor cylinder device 16D is provided with a cylinder main body 282 of a cylinder mechanism 76 instead of the cylinder main body 82 of the cylinder mechanism 76 of the above-described motor cylinder device 16. Incidentally, the internal mechanism of the cylinder mechanism 76 is configured similarly to the motor cylinder device 16.

The cylinder main body 282 is substantially in a cylindrical shape. A flange portion 282*a* is formed at the base end portion of this cylinder main body 282. Bosses 283*a*, 283*b*, and 283*c* substantially in a cylindrical shape are formed protruding toward the side direction (the left side direction).

The bosses 283*a* and 283*b* are arranged as stub bosses in the present embodiment, and formed with a distance from each other with respect to the axial direction (central axis CL). The boss 283*b* is located in the vicinity of the tip end of the cylinder main body 282, and the boss 283*a* is located substantially at the central portion with respect to the axial direction of the cylinder main body 282, which is closer to the base end side (the front side) than the boss 283*b* is. Further, the boss 283*a* on the base end side is located a little upper with respect to the vertical direction (upper/lower direction) than the boss 283*b* on the tip end side.

The boss 283*c* is a portion arranged as one mount portion for an attaching bracket 290 and is located below the vicinity of the boss 283 on the base end side. Further, the boss diameter D1 of the boss 283*c* is made larger than the boss diameter D2 of the bosses 283*a* and 293*b*. Still further, a screw hole 283*c*1 (The screw groove is not shown.) is formed at the center of the boss 283*c* to be screw-engaged with a later-described bolt 300.

Incidentally, on the side (right side) opposite to the bosses 283*a*, 283*b*, and 283*c*, the cylinder main body 282 is provided with bosses 285*b* (The boss on the base end side is not shown.) at positions corresponding to the bosses 283*a* and 283*b*, and a boss 285*c* (see FIG. 15) at a position corresponding to the boss 283*c*. For example, the bosses 285*b* (One boss is not shown.) corresponding to the bosses 283*a* and 283*b* are used for ports.

Further, in the motor cylinder device 16D, the housing 172 of the driving force transmission section 73 is provided with a bolt 280 (see FIG. 13) at the left side portion, a bolt 282 at the right side portion (see FIG. 15), and a bolt 284 (see FIG. 15) at the bottom portion, the bolts 280, 282, and 284 are protruding. The base end portion of the bolt 280 is attached to the housing 172 through a rubber bush 280*a*. Incidentally, though not shown, the bolts 282 and 284 are also attached to the housing 172 likewise through a rubber bush. Each of the bolts 280, 282, and 284 is arranged such as to be located on a plane perpendicular to the axial direction (central axis CL). The rubber bush 280*a* is a buffer member of rubber substantially in a cylindrical shape capable of absorbing vibration and shock (Later described rubber bushes 298 and 299 are similar.)

The motor cylinder device 16D is attached to a side frame 1 (see FIG. 12), which is arranged on the front side with respect to the figure, through fixing portions 291 and 292 of the attaching bracket 290 and with bolts 286 and 288. A method of attachment between the motor cylinder device 16D and the attaching bracket 290 will be described later.

Figure 14A:
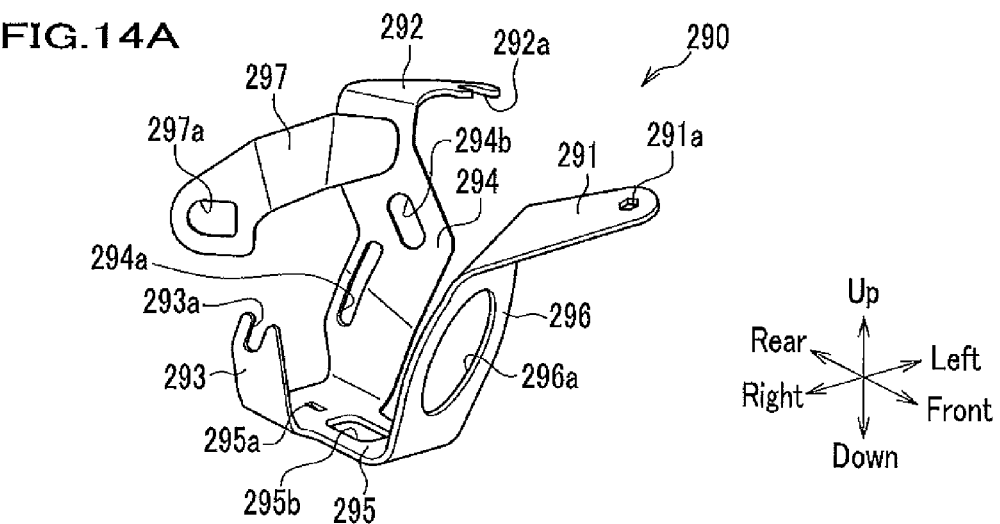
Figure 14B:
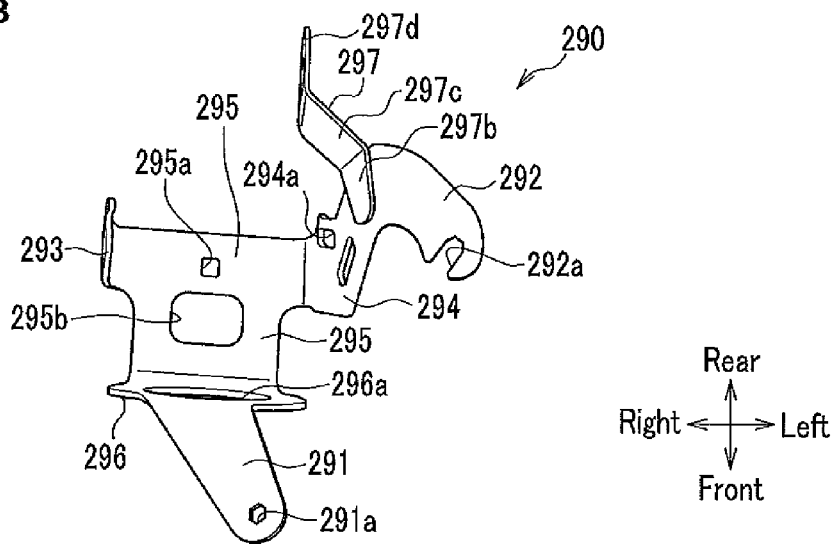
Figure 14C:
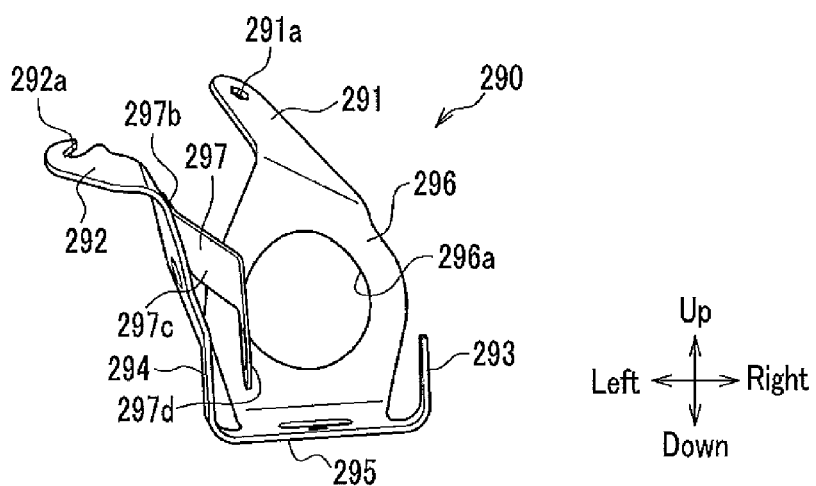

FIGS. 14A, 14B, and 14C are perspective views showing only a bracket for attaching the motor cylinder device to the vehicle body, wherein FIG. 14A is a view from obliquely front, FIG. 14B is a view from above, and FIG. 14C is a view from the axial direction. The motor cylinder device 16D is attached to the side frame 1 (see FIG. 12) through one attaching bracket 290.

As shown in FIG. 14B, the attaching bracket 290 is formed of a steel plate or the like, and includes side plates 293 and 294 for sandwiching the motor cylinder device 16D (see FIG. 13) from the left-right directions and thereby supporting it, a bottom plate 295 for supporting the middle portion (the lower portion of the housing 172, see FIG. 16) of the motor cylinder device 16D from beneath, the bottom plate 295 being continuous from the bottom sides of the side plates 293 and 294 and substantially horizontal and substantially in a rectangular shape, a back plate 296 that is substantially along the vertical direction and continuous from the bottom plate 295, and an extension plate 297 for supporting the tip end portion (the left side portion of the cylinder main body 282, see FIG. 16) of the motor cylinder device 16D, the extension plate 297 being continuous from the side plate 294.

The side plate 293 is standing upward along the vertical direction from the rear side of the right end portion of the bottom plate 295 and is provided with a notch 293*a* in a U-shape at the upper end portion thereof. The height of the notch 293 is set such as to match with a bolt 282 (see FIG. 15) provided at the left side portion of the housing 172.

The side plate 294 is standing upward along the vertical direction from the rear side of the left end portion of the bottom plate 295, and is formed upward longer than the plate portion 293*a* on the right side. Further, the side plate 294 is provided with a long hole 294*a* extending upward/downward at a position facing the notch 293*a* with respect to the left-right direction. Incidentally, the lower end portion of the long hole 294*a* is set to the height matching with the notch 293*a*. Further, the side plate 294 is provided with a hole 294*b*, for removing material, upper than the long hole 294*a*. Still further, the above-described fixing portion 292 is formed continuously from the upper end of the side plate 294 and is extended substantially to the left side.

Further, the extension plate 297 extending backward is fixed to the side plate 294 by welding or the like. Incidentally, in the present embodiment, although the extension plate 297 is formed as a separate body from the side plate 294 and the like, the extension plate 297 may be formed integrally with the side plate 294 and the like. Further, a long hole 297*a* is formed at the tip end of the extension plate 297. This long hole 297*a* is formed linearly at the marginal portion thereof on the front side, and formed in a curved shape at the marginal portion thereof on the rear side.

The back plate 296 is standing upward along the vertical direction from the front end portion of the bottom plate 295. Further, the back plate 296 is provided with a large diameter opening 296*a* penetrating the central portion thereof. The opening 296*a* is formed with a diameter larger than the diameter of the cylindrical protrusion portion 173*a* of the cover 173 (see FIG. 13) of the driving force transmission section 73. Further, the above-described fixing portion 291 is formed continuously from the upper end of the back plate 296 such as to extend substantially forward.

As shown in FIG. 14B, the bottom plate 295 is provided with a penetration hole 295*a*, which a bolt 282 (see FIG. 15) penetrates, at the central portion with respect to the left-right direction (the vehicle transverse direction) between the side plates 293 and 294. Further, the bottom plate 295 is provided with a hole 295*b*, for removing material, ahead of the penetration hole 295*a*.

The extension plate 297 includes a base end portion 297*b* extending in the front-rear direction and fixed to the side plate 294, a middle portion 297*c* extending with a rightward inclination (to the side plate 293 side) with respect to the base end portion 297*b*, and a tip end portion 297*d* extending in the front-rear direction, and is formed in a crank shape. The tip end portion 297*d* is provided with the above-described long hole 297*a*.

Further, a bolt insertion hole 291*a*, which the fastening bolt 286 (see FIG. 13) penetrates, is formed at the tip end of the fixing portion 291. A notch 292*a* in a U-shape, which the fastening bolt 288 (see FIG. 13) penetrates, is formed at the tip end of the fixing portion 292.

As shown in FIG. 14C, the extension plate 297 is arranged such as to incline downward in the vertical direction from the base end portion 297*b* to the tip end portion 297*d*. The tip end portion 297*d* of the extension plate 297 is located on the inner side (right side) than the side plate 294.

Returning to FIG. 13, in mounting the motor cylinder device 16D on the attaching bracket 290 structured as described above, the motor cylinder device 16D is mounted such that the protrusion portion 173*a* of the cover 173 of the driving force transmission section 73 penetrates the opening 296*a* of the back plate 296, and the lower portion of the driving force transmission section 73 of the motor cylinder device 16D is disposed with the bottom thereof on the bottom plate 295, with the left side thereof at the side plate 294, and the right side thereof at the side plate 293. Herein, the bolt 280 on the motor cylinder device 16D side is made penetrate through the long hole 294a of the side plate 294, the bolt 282 (See FIG. 15) is made penetrate through the notch 293a of the side plate 293, and the bolt 284 (see FIG. 15) is made penetrate through the penetration hole 295a of the bottom plate 295. Then, a nut 281 is made screw-engaged with the bolt 280, a nut 283 is made screw-engaged with the bolt 282, and a nut 285 is made screw-engaged with the bolt 284. Thus, the left and right portions and the lower portion of the driving force transmission section 73 are elastically supported on the attaching bracket 290.

Further, in a state that the left and right sides of the tip end portion 297d of the extension plate 297 is sandwiched by a pair of rubber bushes 298 and 299, a bolt 300 penetrates through a hole 298a of the rubber bush 298, the long hole 297a, and a hole 299a of the rubber bush 299, and screw-engages with a screw hole 283c1 formed in the boss 283c of the cylinder main body 282. Thus, the extension plate 297 is elastically supported by the cylinder main body 282.

Figure 15:
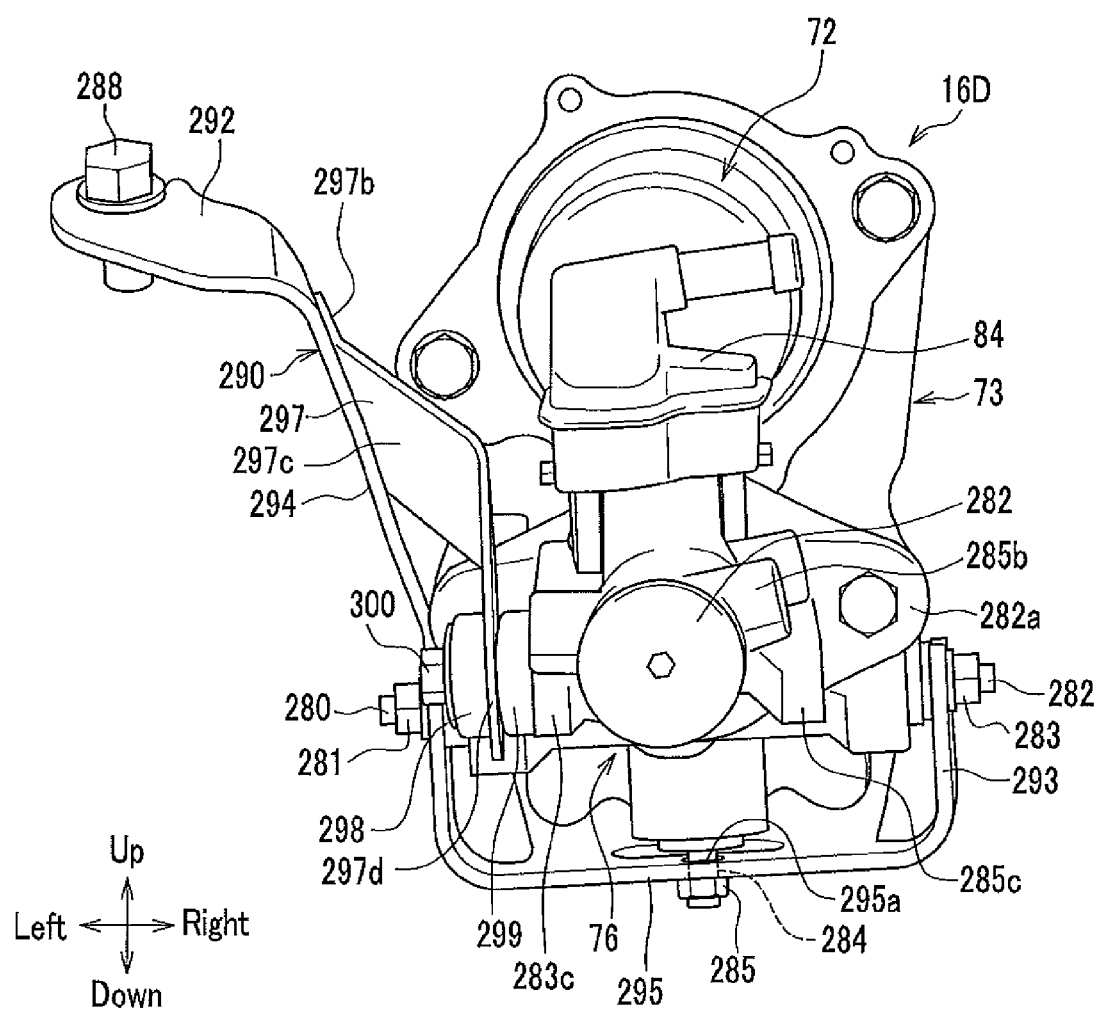
FIG. 15 is a view of a fitting state of the bracket to the motor cylinder device from the axial direction.
Figure 16:
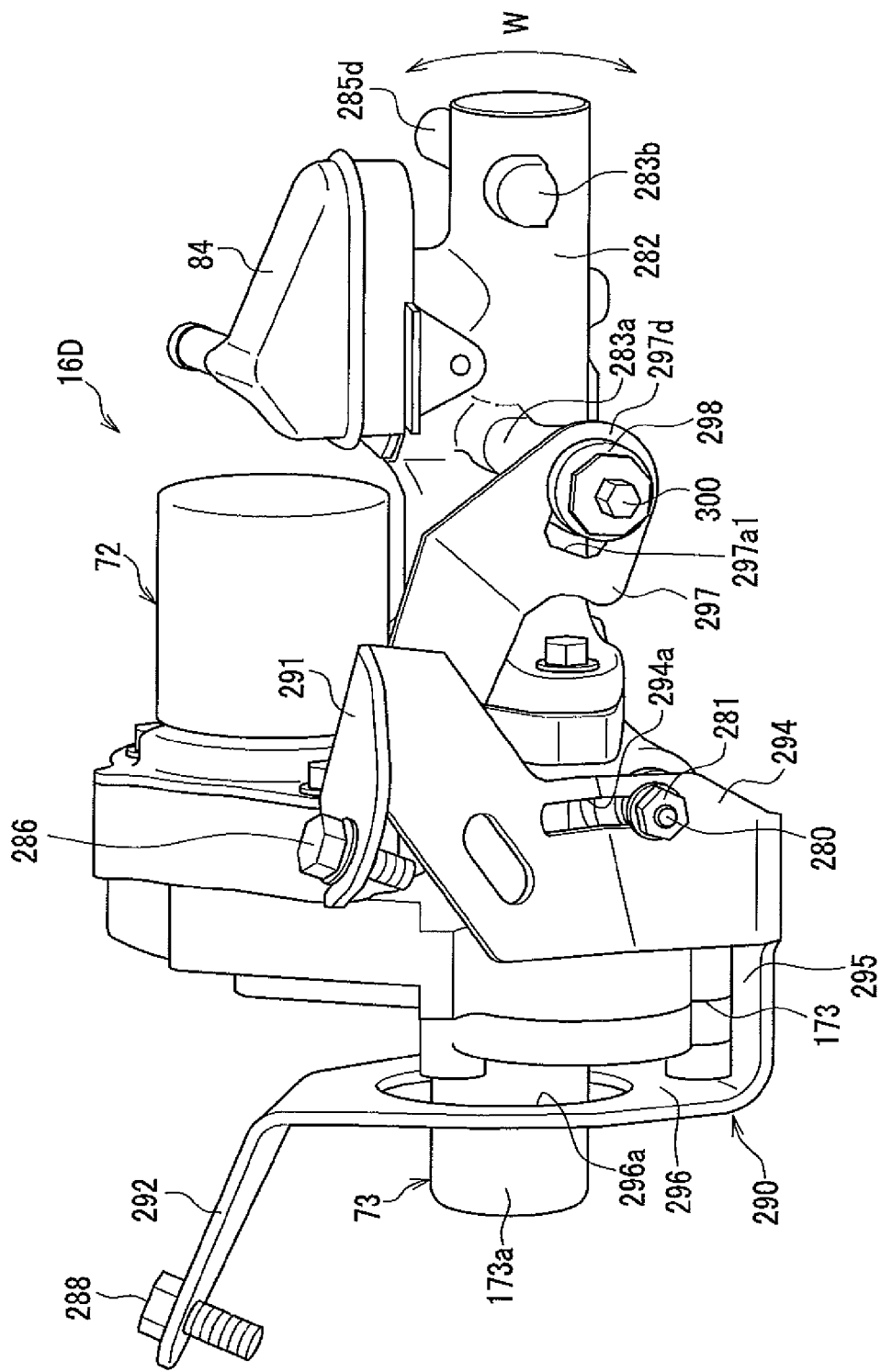
FIG. 16 is a perspective view of a fitting state of the bracket to the motor cylinder device.

FIG. 15 is a view of a fitting state of the bracket to the motor cylinder device from the axial direction, and FIG. 16 is a perspective view of a fitting state of the bracket to the motor cylinder device.

As shown in FIG. 15, the motor cylinder device 16D is sandwiched at the left and right side portions of the driving force transmission section 73 thereof by the side plates 293 and 294, and is elastically supported at the lower portion thereof by the bottom plate 295. As shown in FIG. 16, the motor cylinder device 16D is elastically supported at the left side portion of the cylinder main body 282 of the cylinder mechanism 76 thereof by the extension plate 297. In such a manner, the attaching bracket 290 is arranged to elastically support the motor cylinder device 16D at four points.

In the different embodiment as has been described above, the cylinder mechanism 76 is in advance provided with unprocessed bosses 283a, 283b, 283c, 285b, and 285c (partially not shown) in plural directions (two directions), wherein one boss 283c is formed for mounting the motor cylinder device 16D to the side frame (vehicle body) 1, and other bosses 285b (The other one is not shown.) is formed as a port communicating with the cylinder mechanism 76 (the first hydraulic pressure chamber 98a and the second hydraulic pressure chamber 98b). Accordingly, it is not necessary to additionally form a mount portion on the cylinder mechanism 76. Further, as it is only required to form a screw hole 283c1 for bolt fastening on a side of the boss 283c (stub boss side), the mount portion can be easily processed.

Further, in the different embodiment, as shown in FIG. 15 and FIG. 16, by supporting the motor cylinder device 16D at four points through the attaching bracket 290, it is possible to reduce vibration generated when the electric motor 72 is driven, for example, rotational vibration W (see FIG. 16) with the portion of the three point support on a side of the housing 172 as the center. As a result, sound noise generated by occurrence of vibration can be reduced.

Further, in the different embodiment, by making the boss diameter D1 of the boss 283c be larger than the boss diameter D2 of the bosses 283a and 283b, it is possible to more effectively prevent vibration generated when the electric motor 72 is driven, and as a result, it is possible to effectively reduce sound noise generated accompanying the vibration.

Incidentally, in the different embodiment, three point support, on the side of the housing 172, of the driving force transmission section 73 has been described, taking an example of a case of using the bolts 280, 282, and 284, and the nuts 281, 283, and 285, and the like, however, an arrangement may be made with three point support similar to the case of the motor cylinder device 16 shown in FIG. 6.

Further, the different embodiment has been described, taking an example of a case of making the direction of attaching the motor cylinder device 16D reverse in terms of the front-rear direction, however, an arrangement may be made such as to attach the motor cylinder device 16D to the side frame (vehicle body) 1 with disposition similar to that of the motor cylinder device 16 shown in FIG. 1. In this case, an arrangement can be made by reversing, in terms of the left-right sides, the side plate 293 on the right side of the attaching bracket 290 and the side plate 294 and the extension portion 296 on the left side of the attaching bracket 290, making the boss 285c (see FIG. 15) be the support portion of the extension plate 297, and making the bosses 283a and 283b be the ports.

Still further, the different embodiment has been described, taking an example of a case of providing an extension plate 297 on one side, however, an arrangement may be made such as to provide extension plates 297 on both the left side and the right side.

DESCRIPTION OF REFERENCE SYMBOLS

1 vehicle body
10 vehicle brake system
14 input device
16, 16A, 16B, and 16C motor cylinder device (electric brake actuator)
18 VSA device
72 electric motor
73 driving force transmission section
74 electric actuator
76 cylinder mechanism
83a and 83b boss (for mount)
85a and 85b boss (for port)
88a first slave piston (piston)
88b second slave piston (piston)
V vehicle

The invention claimed is:

1. An electric brake actuator for a vehicle brake-by-wire system including an input device to which braking operation by an operator is input and the electric brake actuator provided for generating a hydraulic brake pressure, based on at least an electric signal according to the braking operation, wherein the electric brake actuator comprises:
an actuator mechanism configured to generate a driving force, based on the electric signal, the actuator mechanism comprising, proximate a center of gravity of the electric brake actuator, a first mount portion for use in attaching the electric brake actuator to a vehicle body; and
a cylinder mechanism separate from said input device and configured to apply a pressure to brake fluid by moving a piston along an axial direction by the driving force transmitted from the actuator mechanism,
wherein the cylinder mechanism is in advance provided with a plurality of unprocessed bosses;
wherein a first one of the bosses is configured as a second mount portion for use in attaching the electric brake actuator to the vehicle body, and a second one of the bosses, disposed on a side of the cylinder mechanism substantially opposite from, and aligned with the first one of the bosses, is configured as at least one port for fluidly communicating with the cylinder mechanism;

wherein the second mount portion comprises a boss having a hollow cylindrical bore formed therein, and wherein a rubber bush and a cylindrical collar are provided for coaxial placement in the hollow bore.

2. The electric brake actuator according to claim 1, wherein bosses for processing into the at least one port are provided on opposite sides of the cylinder mechanism.

3. The electric brake actuator according to claim 2, wherein the boss for the second mount portion is provided on an outer side with respect to the vehicle transverse direction, and wherein bosses for the at least one port are provided on an inner side with respect to a transverse direction of the vehicle body.

4. The electric brake actuator according to claim 1, wherein bosses to be processed into the at least one port are formed upward and downward along a vertical direction.

5. The electric brake actuator according to claim 1, wherein an input port to which the brake fluid is input and an output port from which the brake fluid is output are formed at the same boss.

6. The electric brake actuator according to claim 1, wherein the actuator mechanism comprises a housing removably attached to the cylinder mechanism, the housing having left, right, and lower mount holes formed therein which define the first mount portion, and wherein an annular rubber bushing is provided for insertion in each of the left, right, and lower mount holes.

7. An electric brake actuator for a vehicle brake-by-wire system including an input device to which braking operation by an operator is input, the electric brake actuator provided for generating a hydraulic brake pressure based on at least an electric signal according to the braking operation, the electric brake actuator comprising:

an actuator mechanism configured to generate a driving force, based on the electric signal, the actuator mechanism comprising an electric motor, and a driving force transmission section including, proximate a center of gravity of the electric brake actuator, a first mount portion for use in attaching the electric brake actuator to a vehicle body;

a cylinder mechanism separate from said input device and configured to apply a pressure to brake fluid by moving a piston along an axial direction by the driving force transmitted from the actuator mechanism, the driving force transmission section interconnecting the electric motor and the cylinder mechanism, wherein the cylinder mechanism is provided with a plurality of bosses, including first and third bosses configured as a second mount portion for use in attaching the electric brake actuator to the vehicle body, and second and fourth bosses, disposed on a side of the cylinder mechanism substantially opposite from, and aligned with the first and third bosses, respectively, the second and fourth bosses configured as ports for fluidly communicating with the cylinder mechanism;

wherein each of the second mount portions comprises a boss having a hollow cylindrical bore formed therein, and wherein a rubber bush and a cylindrical collar are provided for coaxial placement in each of the the hollow bores, respectively.

8. The electric brake actuator according to claim 7, wherein the boss for the second mount portion is provided on an outer side with respect to the vehicle transverse direction, and wherein bosses for the ports are provided on an inner side with respect to a transverse direction of the vehicle body.

9. The electric brake actuator according to claim 7, wherein bosses to be processed into the ports are formed upward and downward along a vertical direction.

10. The electric brake actuator according to claim 7, wherein an input port to which the brake fluid is input and an output port from which the brake fluid is output are formed at the same boss.

11. The electric brake actuator according to claim 7, wherein the actuator mechanism comprises a housing removably attached to the cylinder mechanism, the housing having left, right, and lower mount holes formed therein which define the first mount portion, and wherein an annular rubber bushing is provided for insertion in each of the left, right, and lower mount holes.

12. A vehicle having a brake-by-wire system comprising a master cylinder configured to receive a braking operation, and an electric brake actuator provided for generating a hydraulic brake pressure, based on at least an electric signal according to the braking operation, the electric brake actuator comprising:

an actuator mechanism configured to generate a driving force, based on the electric signal, the actuator mechanism comprising, proximate a center of gravity of the electric brake actuator, a first mount portion operativly attaching the electric brake actuator to a vehicle body; and a cylinder mechanism separate from said input device and configured to apply a pressure to brake fluid by moving a piston along an axial direction by the driving force transmitted from the actuator mechanism, wherein the cylinder mechanism is in advance provided with a plurality of unprocessed bosses;

and wherein a first one of the bosses is configured as a second mount portion attaching the electric brake actuator to the vehicle body, and a second one of the bosses, disposed on a side of the cylinder mechanism substantially opposite from, and aligned with the first one of the bosses, is configured as at least one port for fluidly communicating with the cylinder mechanism.

\* \* \* \* \*